United States Patent [19]

Bonner et al.

[11] Patent Number: 5,339,037

[45] Date of Patent: Aug. 16, 1994

[54] APPARATUS AND METHOD FOR DETERMINING THE RESISTIVITY OF EARTH FORMATIONS

[75] Inventors: Stephen D. Bonner, Sugar Land; Richard A. Rosthal; Abdullah A. Bagersh, both of Houston, all of Tex.

[73] Assignee: Schlumberger Technology Corporation, Houston, Tex.

[21] Appl. No.: 955,101

[22] Filed: Oct. 9, 1992

[51] Int. Cl.$^5$ .......................... G01V 3/20; G01V 3/18
[52] U.S. Cl. ..................................... 324/366; 324/369
[58] Field of Search ............... 324/366, 369, 370, 354, 324/355, 356, 338, 339, 340, 341, 342, 343

[56] References Cited

U.S. PATENT DOCUMENTS

| | | |
|---|---|---|
| 2,354,887 | 8/1944 | Silverman et al. |
| 3,186,222 | 6/1965 | Martin |
| 3,187,252 | 6/1965 | Hungerford |
| 3,305,771 | 2/1967 | Arps |
| 3,408,561 | 10/1968 | Redwine et al. |
| 3,967,201 | 6/1976 | Rorden |
| 4,360,777 | 11/1982 | Segesman |
| 4,553,097 | 11/1985 | Clark |
| 4,567,759 | 2/1986 | Ekstrom et al. |
| 4,575,681 | 3/1986 | Grosso et al. |
| 4,578,675 | 3/1986 | MacLeod |
| 4,618,828 | 10/1986 | Raynal |
| 4,630,243 | 12/1986 | MacLeod |
| 4,692,908 | 9/1987 | Ekstrom et al. |
| 4,725,837 | 2/1988 | Rubin |
| 4,739,325 | 4/1988 | MacLeod |
| 4,786,874 | 11/1988 | Grosso et al. |
| 4,839,644 | 6/1989 | Safinya et al. |
| 4,912,415 | 3/1990 | Sorenson |
| 4,979,151 | 12/1990 | Ekstrom et al. |
| 5,017,778 | 5/1991 | Wraight |
| 5,045,795 | 9/1991 | Gianzero et al. |
| 5,130,950 | 7/1992 | Orban et al. |

FOREIGN PATENT DOCUMENTS 685727  5/1964  Canada .

OTHER PUBLICATIONS

S. Gianzero et al., "A New Resistivity Tool for Measurement-While-Drilling", SPWLA Twenty-Sixth Annual Logging Symposium, Jun. 17-20, 1985.

T. I. F. Grupping, et al., "Performance Update of a Dual-Resistivity MWD Tool with Some Promising Results in Oil-Based Mud Applications", SPE 18115, pp. 73-85, Oct. 2-5, 1988, Houston, Tex.

T. I. F. Grupping et al., "Recent Performance of the Dual-Resistivity MWD Tool", SPE Formation Evaluation, pp. 171-176, Jun. 1990.

S. Gianzero, et al., "Determining the Invasion Near the Bit with the MWD Toroid Sonde", SPWLA Twenty-Seventh Annual Logging Symposium, pp. 1-17, Jun. 9-13, 1986.

Schlumberger Log Interpretation Principles—vol. I, pp. 19-25 (1972). (no month).

*Primary Examiner*—Walter E. Snow
*Attorney, Agent, or Firm*—Martin Novack; Wayne I. Kanak

[57] ABSTRACT

An apparatus for determining the resistivity of formations surrounding an earth borehole. An elongated electrically conductive body is movable through the borehole. A first transmitter establishes a first current in the body from a first transmitter position on the body, the first current traveling in a path that includes the body and the formations. An electrode is mounted on the body and has a surface that is electrically isolated from the surface of the body. A first electrical signal, resulting from the first current, is measured at the electrode. A second transmitter establishes a second current in the body from a second transmitter position on the body that is spaced from the first transmitter position, the second current traveling in a path that includes the body and the formations. A second electrical signal, resulting from the second current, is measured at the electrode. A current monitor measures the axial current passing a monitor position on the body to obtain a monitor current value. An indication of formation resistivity is derived as a function of the first electrical signal, the second electrical signal, and the monitor current value.

42 Claims, 27 Drawing Sheets

APPARATUS AND METHOD FOR DETERMINING THE RESISTIVITY OF EARTH FORMATIONS

FIELD OF THE INVENTION

This invention relates to the field of well logging and, more particularly, to well logging apparatus for determining earth formation resistivity. The invention has general application to the well logging art, but the invention is particularly useful for logging-while-drilling (also called measurement-while-drilling).

BACKGROUND OF THE INVENTION

Resistivity logging, which measures the electrical resistivity of formations surrounding an earth borehole, is a commonly used technique of formation evaluation. For example, porous formations having high resistivity generally indicate the presence of hydrocarbons, while porous formations having low resistivity are generally water saturated. In so-called "wireline" well logging, wherein measurements are taken in a well bore (with the drill string removed) by lowering a logging device in the well bore on a wireline cable and taking measurements with the device as the cable is withdrawn, there are several techniques of resistivity logging which use elements such as electrodes or coils. Various arrangements of electrodes, on the logging device and at the earth's surface, have been utilized to measure electrical currents and/or potentials from which formation resistivity can be derived. For example, button electrodes have been employed on a pad which is urged against the borehole wall. These electrodes have been used to obtain azimuthal resistivity measurements, and focusing techniques have been employed to obtain resistivity measurements that have substantial lateral extent into the formations and provide relatively high vertical resolution resistivity information.

Various techniques for measuring resistivity while drilling have also been utilized or proposed. Techniques employed in wireline logging may or may not be adaptable for use in logging-while-drilling equipment. The borehole presents a difficult environment, even for wireline logging, but the environment near the well bottom during drilling is particularly hostile to measuring equipment. For logging-while-drilling applications, the measuring devices are housed in heavy steel drill collars, the mechanical integrity of which cannot be compromised. Measurement approaches which require a substantial surface area of electrically insulating material on the surface of a drill collar housing are considered impractical, since the insulating material will likely be damaged or destroyed. This is particularly true for measuring structures that would attempt to attain intimate contact with the newly drilled borehole wall as the drill string continues its rotation and penetration, with the attendant abrasion and other stresses.

One resistivity measuring approach is to utilize a plurality of toroidal coil antennas, spaced apart, that are mounted in insulating media around a drill collar or recessed regions thereof. A transmitting antenna of this nature radiates electromagnetic energy having a dominant transverse magnetic component, and can use the electrically conductive body of the drill collar to good advantage, as described next.

In U.S. Pat. No. 3,408,561 there is disclosed a logging-while-drilling system wherein a receiving toroidal coil is mounted in a recess on a drill collar near the drill bit and a transmitting toroidal coil is mounted on the drill collar above the receiver coil. The drill collar serves as part of a one-turn "secondary winding" for the toroidal antennas, the remainder of such "secondary winding" including a current return path through the mud and formations. The voltage induced in the receiver toroidal coil provides an indication of the resistivity of formations around the drill bit. U.S. Pat. No. 3,305,771 utilizes a similar principal, but employs a pair of spaced-apart transmitting toroidal coils and a pair of spaced-apart receiving toroidal coils between the transmitting toroidal coils.

As generally described in the prior art, a transmitter toroidal coil mounted on a drill collar induces current in the drill collar which can be envisioned as leaving the drill collar, entering the formations below the transmitter coil, and returning to the drill string above the transmitter coil. Since the drill collar below the transmitter coil is substantially an equipotential surface, a portion of the current measured by a lower receiver toroidal coil mounted near the drill bit tends to be laterally focused. This can provide a "lateral" resistivity measurement of formations adjacent the drill collar. Also, a portion of current leaving the drill stem below the receiver coil provides a "bit resistivity" measurement; that is, a measurement of the resistivity of the formations instantaneously being cut by the bit. [See, for example, the above-identified U.S. Pat. Nos. 3,408,561 and U.S. Pat. No. 3,305,771, and publications entitled "A New Resistivity Tool For Measurement While Drilling", SPWLA Twenty-Sixth Annual Logging Symposium (1985) and "Determining The Invasion Near The Bit With The MWD Toroid Sonde", SPWLA Twenty-Seventh Annual Logging Symposiuan (1986).]Thus, the prior art indicates that a measurement-while-drilling logging device using toroidal coil transmitting and receiving antennas can be employed to obtain lateral resistivity measurements and/or bit resistivity measurements.

Reference can also be made to the following which relate to measurement-while-drilling using electrodes and other transducers: U.S. Pat. No. 4,786,874, U.S. Pat. No. 5,017,778, and U.S. Pat. No. 5,130,950.

Resistivity measurements obtained using transmitting and receiving toroidal coils on a conductive metal body are useful, particularly in logging-while-drilling applications, but it is desirable to obtain measurements which can provide further information concerning the downhole formations; for example, lateral resistivity information having improved vertical resolution, azimuthal resistivity information, and multiple depths of investigation for such resistivity information.

In copending U.S. Pat. No. 5,235,285; assigned to the same assignee as the present application, there is disclosed an apparatus utilizing a toroidal coil antenna mounted, in an insulating medium, on a drill collar to induce a current which travels in a path that includes the drill collar and earth formations around the drill collar. [See also U.S. Pat. No. 5,200,705 assigned to the same assignee as the present application.] As was generally known in the art, one or more toroidal coil receiving antennas can be mounted, in an insulating medium, on the drill collar to obtain the types of measurements described above. The apparatus of the referenced copending Application expands on the toroid-to-toroid type of measurement to obtain further useful information about the downhole formations. In one form thereof at least one electrode is provided on the drill collar and is utilized to detect currents transmitted by the transmitter toroidal coil which return via the formations to the electrode(s) laterally; that is, approximately normal to the axis of the drill collar. The electrodes preferably have a relatively small vertical extent, and the measurements taken with these electrodes are useful in obtaining formation resistivity with relatively high vertical resolution, as well as relatively high depth of investigation for the resolution provided. The electrodes can also provide azimuthal resistivity information. Thus, resistivity logging measurements are obtained that can supplement or replace resistivity measurements obtained with toroidal coil receiving antenna(s). The electrode(s) can be mounted in a drill collar or on a stabilizer blade attached to or integral with the drill collar. In embodiments thereof, button-type electrodes are utilized, as well as ring-type electrodes. The one or more receiving ring electrode or button electrode can be electrically isolated from the main metal body of the drill collar, using rubber or other insulating material, and the electrical potential kept at the same value as the surrounding metal. The current leaving the electrode can be measured, and the measurement ideally would determine the resistivity of formations in the region immediately surrounding the electrode. However, under certain conditions the measurement may not be accurately representative of the resistivity of the region immediately surrounding the electrode, and it is among the objects of the invention to provide improvement in accuracy of logging devices under such conditions.

SUMMARY OF THE INVENTION

Applicant recognizes that the measurement at an electrode in the described type of system is, at least to some degree, determined by the total current distribution into the overall body of the apparatus which, in the described system, is the drill collar and the conductive drill string coupled therewith. The total current distribution, in turn, depends to some extent on the formation resistivity along the entire length of the drill string. A problem arises when the current measured at the previously described electrode(s) is affected to a substantial degree by formations a meaningful distance from the region of the electrode, and such formations have resistivities that are different than the resistivity of the formations in the region of the electrode(s). For example, a problem occurs in the logging-while-drilling apparatus when the measuring electrode(s) is traversing a resistive bed and the drill bit cuts into a more conductive bed. When this happens the current being emitted from the electrode decreases, falsely indicating a more resistive formation in the region of the electrode. [This occurs when the electrode is below the transmitter, as in the embodiment illustrated in the above-referenced U.S. Pat. No. 5,235,285. Conversely, if the electrode is above the transmitter, the current being emitted from the electrode increases, falsely indicating a more conductive formation in the region of the electrode.] The present invention greatly reduces this and other problems.

In accordance with an embodiment of the invention, an apparatus is disclosed for determining the resistivity of formations surrounding an earth borehole. [In the present application, any references to the determination or use of resistivity are intended to generically mean conductivity as well, and vice versa. These quantities are reciprocals, and mention of one or the other herein is for convenience of description, and not intended in a limiting sense.] An elongated electrically conductive body is movable through the borehole. A first transmitter means is provided for establishing a first current in the body from a first transmitter position on the body, said first current traveling in a path that includes the body and the formations. An electrode is mounted on the body and has a surface that is electrically isolated from the surface of the body. [Throughout the present application, "mounted on" and "mounted in" are both intended to generically include "mounted on or in".] Means are provided for measuring at the electrode a first electrical signal resulting from the first current. A second transmitter means is provided for establishing a second current in the body from a second transmitter position on the body that is spaced from the first transmitter position, the second current traveling in a path that includes the body and the formations. Means are provided for measuring at the electrode a second electrical signal resulting from the second current. Current monitor means are provided for measuring the axial current passing a monitor position on the body to obtain a monitor current value. Means are then provided for deriving an indication of formation resistivity as a function of the first electrical signal, the second electrical signal, and the monitor current value.

In one embodiment of the invention, the current monitor means comprises means for obtaining a first monitor current value when the first transmitter means is operative, and means for obtaining a second monitor current value when the second transmitter means is operative, the deriving means being operative to derive said indication of formation resistivity as a function of the first electrical signal, the second electrical signal, said first monitor current value, and said second monitor current value. In a form of this embodiment, a further current monitor means is provided at a further monitor position for measuring the axial current passing a further monitor position on the body to obtain a further monitor current value, and the deriving means is operative to derive the indication of formation resistivity as a function of the further monitor current value.

As described further in detail hereinbelow, the present invention operates to effectively reduce or eliminate the deleterious effects that resistivity bedding contrasts in the general vicinity of the tool can have on the intended measurement of the resistivity of formations surrounding the measuring electrode, Further features and advantages of the invention will become more readily apparent from the following detailed description when taken in conjunction with the accompanying drawings.

DETAILED DESCRIPTION

Figure 1:
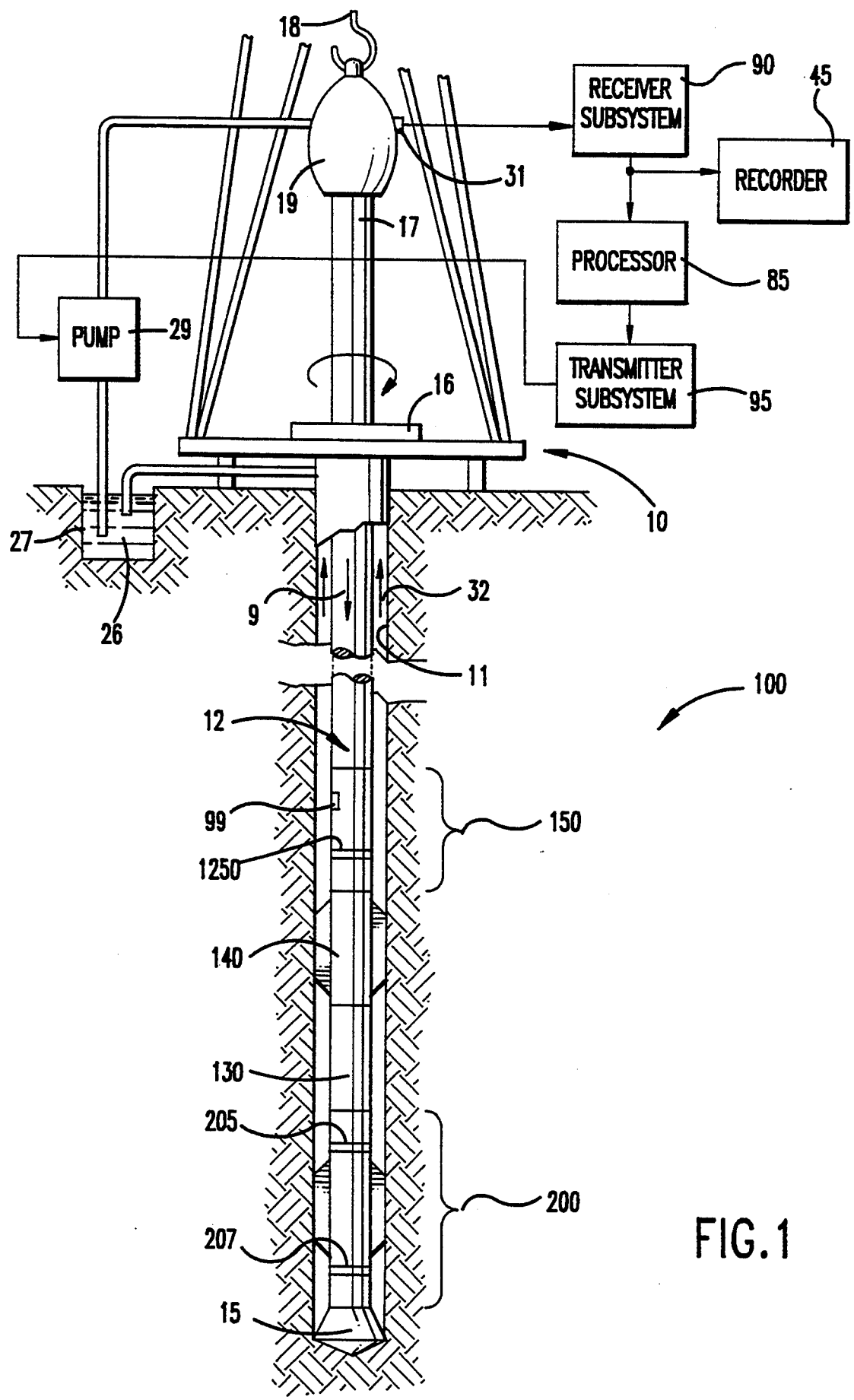
FIG. 1 is a schematic diagram, partially in block form, of a logging-while-drilling apparatus that can be used in practicing an embodiment of the invention, shown attached to a drill string that is suspended in a borehole by a conventional drilling rig.

Referring to FIG. 1, there is illustrated a measuring-while-drilling apparatus as described in the above-referenced U.S. Pat. No. 5,235,285, and in which an embodiment of an improvement of the invention can be employed. [As used herein, and unless otherwise specified, measurement-while-drilling (also called measuring-while-drilling or logging-while-drilling) is intended to include the taking of measurements in an earth borehole, with the drill bit and at least some of the drill string in the borehole, during drilling, pausing, and/or tripping.] A platform and derrick 10 are positioned over a borehole 11 that is formed in the earth by rotary drilling. A drill string 12 is suspended within the borehole and includes a drill bit 15 at its lower end. The drill string 12 and the drill bit 15 attached thereto are rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Alternatively, the drill string 12 and drill bit 15 may be rotated from the surface by a "top drive" type of drilling rig. Drilling fluid or mud 26 is contained in a pit 27 in the earth. A pump 29 pumps the drilling fluid into the drill string via a port in the swivel 19 to flow downward (arrow 9) through the center of drill string 12. The drilling fluid exits the drill string via ports in the drill bit 15 and then circulates upward in the region between the outside of the drill string and the periphery of the borehole, commonly referred to as the annulus, as indicated by the flow arrows 32. The drilling fluid thereby lubricates the bit and carries formation cuttings to the surface of the earth. The drilling fluid is returned to the pit 27 for recirculation. An optional directional drilling assembly (not shown) with a mud motor having a bent housing or an offset sub could also be employed.

Mounted within the drill string 12, preferably near the drill bit 15, is a bottom hole assembly, generally referred to by reference numeral 100, which includes capabilities for measuring, processing, and storing information, and communicating with the earth's surface. [As used herein, near the drill bit means within several drill collar lengths from the drill bit.] The assembly 100 includes a measuring and local communications apparatus 200 which is described further hereinbelow. In the example of the illustrated bottom hole arrangement, a drill collar 130 and a stabilizer collar 140 are shown successively above the apparatus 200. The collar 130 may be, for example, a pony collar or a collar housing measuring apparatus which performs measurement functions other than those described herein. The need for or desirability of a stabilizer collar such as 140 will depend on drilling parameters. Located above stabilizer collar 140 is a surface/local communications subassembly 150. The subassembly 150, described in further detail in the above-referenced U.S. Pat. No. 5,235,285, includes a toroidal antenna 1250 used for local communication with the apparatus 200, and a known type of acoustic communication system that communicates with a similar system at the earth's surface via signals carried in the drilling fluid or mud. The surface communication system in subassembly 150 includes an acoustic transmitter which generates an acoustic signal in the drilling fluid that is typically representative of measured downhole parameters. One suitable type of acoustic transmitter employs a device known as a "mud siren" which includes a slotted stator and a slotted rotor that rotates and repeatedly interrupts the flow of drilling fluid to establish a desired acoustic wave signal in the drilling fluid. The driving electronics in subassembly 150 may include a suitable modulator, such as a phase shift keying (PSK) modulator, which conventionally produces driving signals for application to the mud transmitter. These driving signals can be used to apply appropriate modulation to the mud siren. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 which is operative to demodulate the transmitted signals, which can then be coupled to processor 85 and recorder 45. An uphole transmitting subsystem 95 is also provided, and can control interruption of the operation of pump 29 in a manner which is detectable by the transducers in the subassembly 150 (represented at 99), so that there is two way communication between the subassembly 150 and the uphole equipment. In existing systems, downward communication is provided by cycling the pump(s) 29 on and off in a predetermined pattern, and sensing this condition downhole. This or other technique of uphole-to-downhole communication can be utilized in conjunction with the features disclosed herein. The subsystem 150 may also conventionally include acquisition and processor electronics comprising a microprocessor system (with associated memory, clock and timing circuitry, and interface circuitry) capable of storing data from a measuring apparatus, processing the data and storing the results, and coupling any desired portion of the information it contains to the transmitter control and driving electronics for transmission to the surface. A battery may provide downhole power for this subassembly. As known in the art, a downhole generator (not shown) such as a so-called "mud turbine" powered by the drilling fluid, can also be utilized to provide power, for immediate use or battery recharging, during drilling. It will be understood that alternative acoustic or other techniques can be employed for communication with the surface of the earth.

Figure 2:
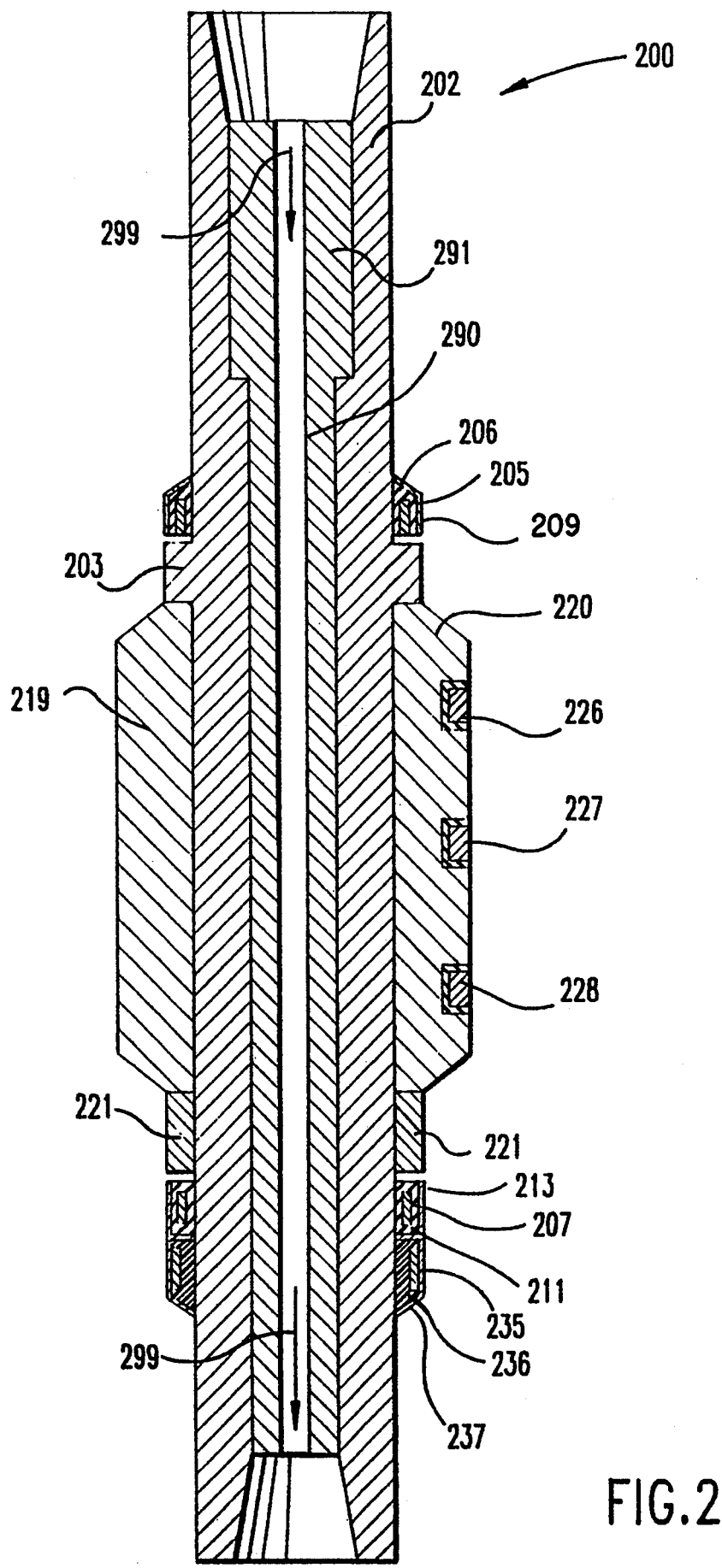
FIG. 2 is a cross-sectional view of a measuring and local communications subassembly as described in the above-referenced U.S. Pat. No. 5,235,285.

As seen in FIG. 2, the subsystem 200 includes a section of tubular drill collar 202 having mounted thereon a transmitting antenna 205, a receiving antenna 207, and receiving electrodes 226, 227, 228 and 235. In the illustrated subsystem the transmitting antenna 205 comprises a toroidal antenna (see also FIG. 3) having coil turns wound on a ferromagnetic toroidal core that is axially coincident with the axis of the drill collar 202. The core may have a circular or rectangular cross-section, although other shapes can be used. The purpose of this toroidal transmitter is to induce a voltage along the drill collar. The drill collar and the formations correspond to a one turn secondary winding. If the transmitter is excited with a drive voltage $V_T$ and the transmitter toroid has $N_T$ turns, then the voltage induced along the drill collar will be $V_T/N_T$. That is, the voltage difference between the drill collar above the transmitter and the drill collar below the transmitter will be $V_T/N_T$. The resultant current travels in a path that includes the drill string and the formations (as well as the borehole fluid which is assumed to have substantial conductivity). The receiving electrodes 226, 227 and 228 are button electrodes mounted in a stabilizer 220, and electrode 235 is a ring electrode. The receiving antenna 207 is another toroidal coil antenna. The toroidal receiver measures the axial current flowing through the drill collar. If the receiver toroid contains $N_R$ turns and the current in the drill collar is I, then the current flowing through the receiver winding into a short circuit will be $I/N_R$.

Figure 3:
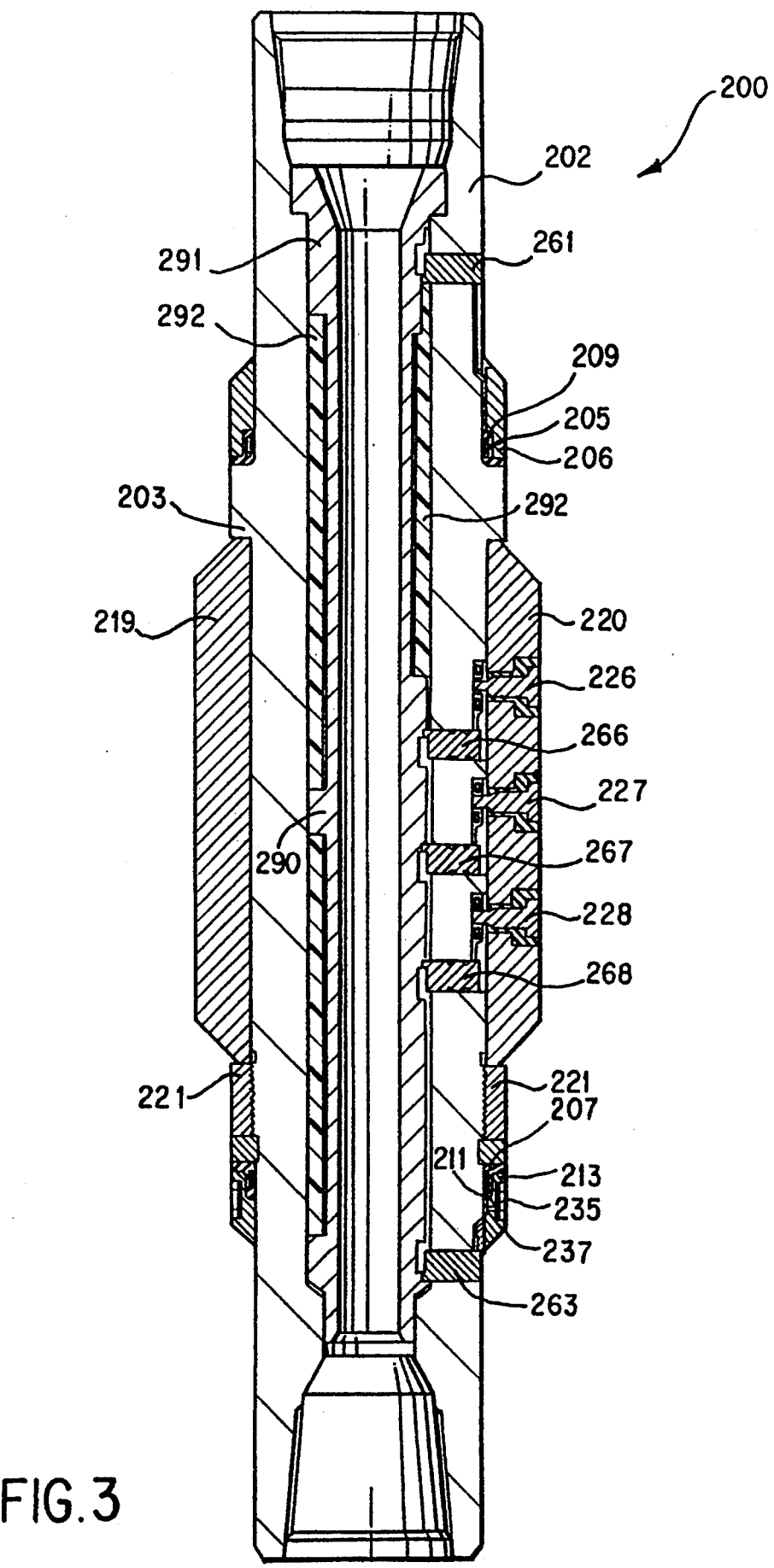
FIG. 3 is a cross-sectional view of the subassembly of FIG. 2, in greater detail.

Referring now also to FIG. 3 as well as FIG. 2, there are illustrated further details of the structure of the measurement and communication subsystem 200 that is housed in the drill collar 202. An annular chassis 290, which contains most of the electronics, fits within the drill collar 202. In this configuration, the drilling mud path is through the center of the chassis, as illustrated by arrows 299 (FIG. 2). The chassis 290 has a number of slots, such as for containment of batteries (at position 291, see FIG. 2) and circuit boards 292. In this configuration, the circuit boards are in the form of elongated thin strips, and can accordingly be planar. Other circuit board configurations or circuit packaging can be utilized. The transmitting toroidal antenna 205 [which can also be utilized in a communications mode as a receiver] is supported in a suitable insulating medium, such as "VITON" rubber 206. The assembled coil, in the insulating mediuan, is mounted on the collar 202 in a subassembly which includes a protective tapered metal ring 209, that is secured to the collar surface by bolts (not shown). The antenna wiring, and other wiring, is coupled to the annular circuit assembly via bulkhead feedthroughs, as represented at 261 (for wiring to antenna 205), 266, 267, 268 (for wiring to electrodes 226, 227 and 228, respectively), and 263 (for wiring to electrode 235 and antenna 207). The receiving toroidal coil antenna 207 is constructed in generally the same way, although with more coil turns in the described configuration, in insulating medium 211, and with protective ring 213. The receiving ring electrode 235 is also mounted in an insulating medium such as a fiberglass-epoxy composite 236, and is held in a subassembly that includes tapered ring 237, which can be integrated with the protective ring for the receiving antenna 207.

Figure 4:
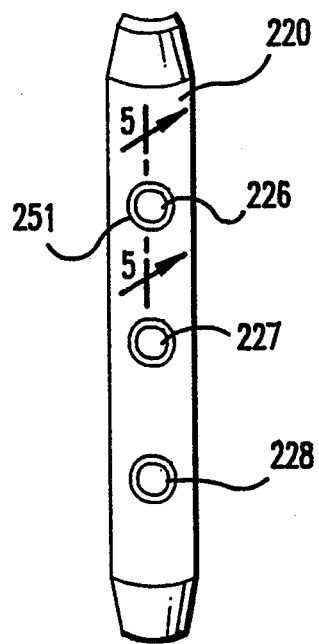
FIG. 4 is a front view of a stabilizer blade, with electrodes mounted therein.

The three button electrodes 226, 227 and 228 are provided in stabilizer blade 220 which may have, for example, a typical straight or curved configuration. [The electrodes can alternatively be mounted in the drill collar itself.] Two of four (or three) straight stabilizer blades 219 and 220 are visible in FIGS. 2 and 3. The stabilizer blades are formed of steel, integral with a steel cylindrical sleeve that slides onto the drill collar 202 and abuts a shoulder 203 formed on the drill collar. The stabilizer is secured to collar 202 with lock nuts 221. The blades can be undersized to prevent wear of the electrodes. The button electrode faces have generally round (in this case, circular) peripheries which will be generally adjacent the borehole wall. The button faces can have generally cylindrical curvatures to conform to the stabilizer surface or can have flat faces with surfaces that are slightly recessed from the stabilizer surface shape. These electrodes span only a small fraction of the total circumferential locus of the borehole and provide azimuthal resistivity measurements. Also, these electrodes have a vertical extent that is a small fraction of the vertical dimension of the stabilizer on which they are mounted, and provide relatively high vertical resolution resistivity measurements. In the described configuration, the surfaces of electrodes 226, 227 and 228 have diameters of about 1 inch (about 2.5 cm.), which is large enough to provide sufficient signal, and small enough to provide the desired vertical and azimuthal measurement resolution. The electrode periphery, which can also be oval, is preferably contained within a circular region that is less than about 1.5 inches (about 3.8 cm.) in diameter. In the described configuration, the top portion of each electrode is surrounded by an insulating medium, such as "VITON" rubber, which isolates the electrode surface from the surface of the stabilizer blade 220. A fiberglass epoxy composite can be used around the base of the electrode. The electrodes 226, 227 and 228 (see also FIG. 4) provide a return path from the formations to the collar 202 (of course, when the AC potential reverses the current path will also reverse), and the current is measured to determine lateral resistivity of the region of the formation generally opposing the electrode. The electrodes 227 and 228 are respectively further from the transmitter than the electrode 226, and will be expected to provide resistivity measurements that tend to be respectively deeper than the measurement obtained from electrode 226. The electrodes are mounted in apertures in the stabilizer 220 that align with apertures in the drill collar 202 to facilitate coupling of the electrodes to circuitry in the annular chassis 290.

Figure 5:
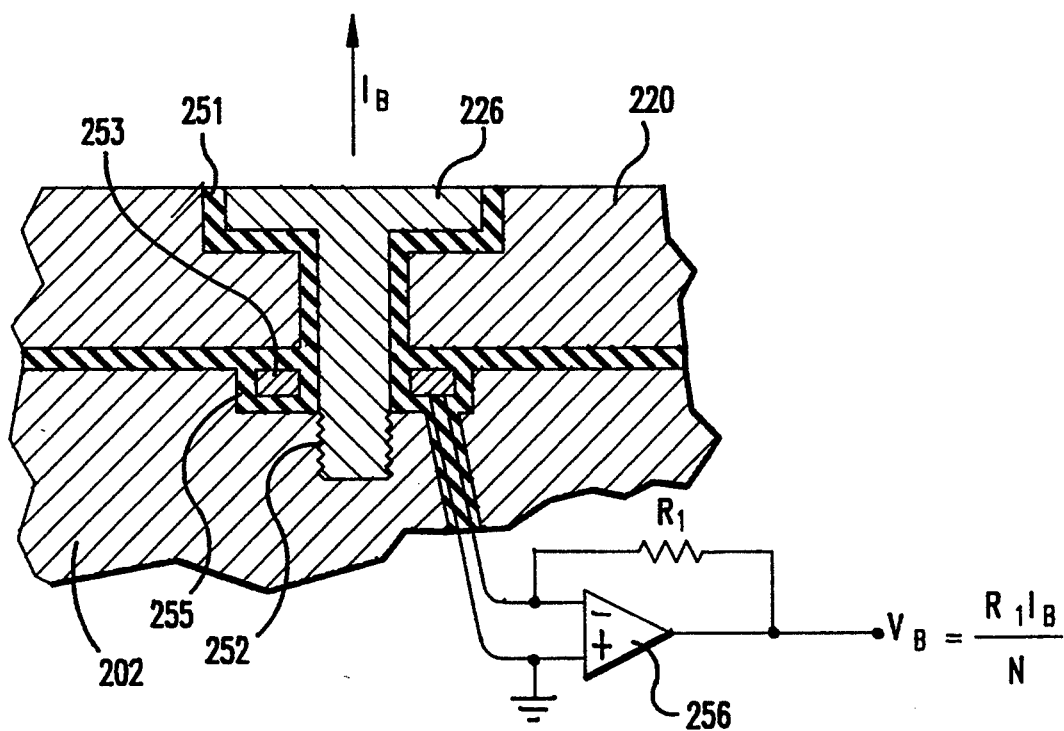
FIG. 5 is a cross-sectional view, as taken through a section defined by section line 5—5 of FIG. 4.
Figure 6:
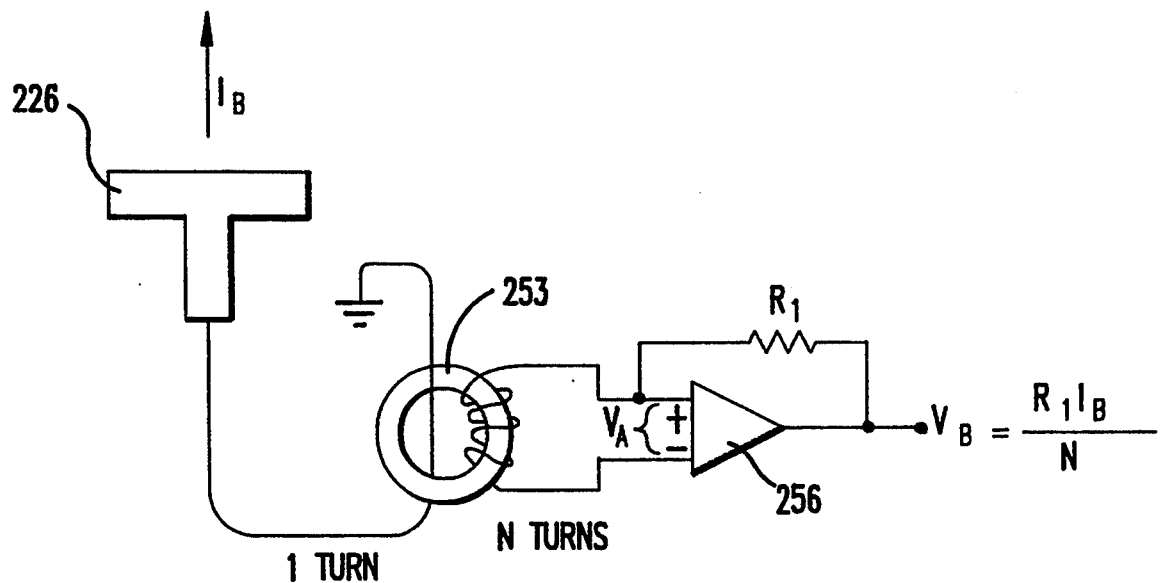
FIG. 6 is a schematic diagram of an equivalent circuit of the FIG. 5 structure.

In one electrode configuration, the electrode body is directly mounted, in the manner of a "stud", in the stabilizer body. As seen in FIG. 5 (and also in FIG. 3), the metal button electrode (226, for example) is mounted in an insulating medium 251, such as "VITON" rubber, and its neck portion engages threading 252 in collar 202. A small toroidal coil 253 is seated in an insulating medium 255, which can also be "VITON" rubber, in a circular recess in the collar surface. The toroidal coil 253 is used to sense current flow in the electrode 226. The leads from coil 253 pass through a bulkhead feed-through (see FIG. 3) to circuitry shown in FIG. 5. In particular, one conductor from the current sensing toroidal coil 253 is coupled to the inverting input of an operational amplifier 256. The other conductor from toroidal coil 253, and the non-inverting input of operational amplifier 256, are coupled to ground reference potential; e.g. the body of drill collar 202. A feedback resistor $R_1$ is provided between the output and the inverting input of operational amplifier 256. The circuit equivalent is illustrated in FIG. 6 which shows the button electrode stud as a single turn through the core of toroidal coil 253, the number of turns in the coil being N. The gain of operational amplifier 256 is very high, and $V_A$, the voltage difference between the inverting and non-inverting input terminals is very small, virtually zero. The input impedance of the operational amplifier is very high, and essentially no current flows into either input terminal. Thus, if the current flow in the electrode 226 is $I_B$, and the current flow in the toroidal coil "secondary" is $I_B/N$, the current $I_B/N$ flows through the feedback resistor $R_1$, making the amplifier output voltage $R_1 I_B/N$.

Figure 7:
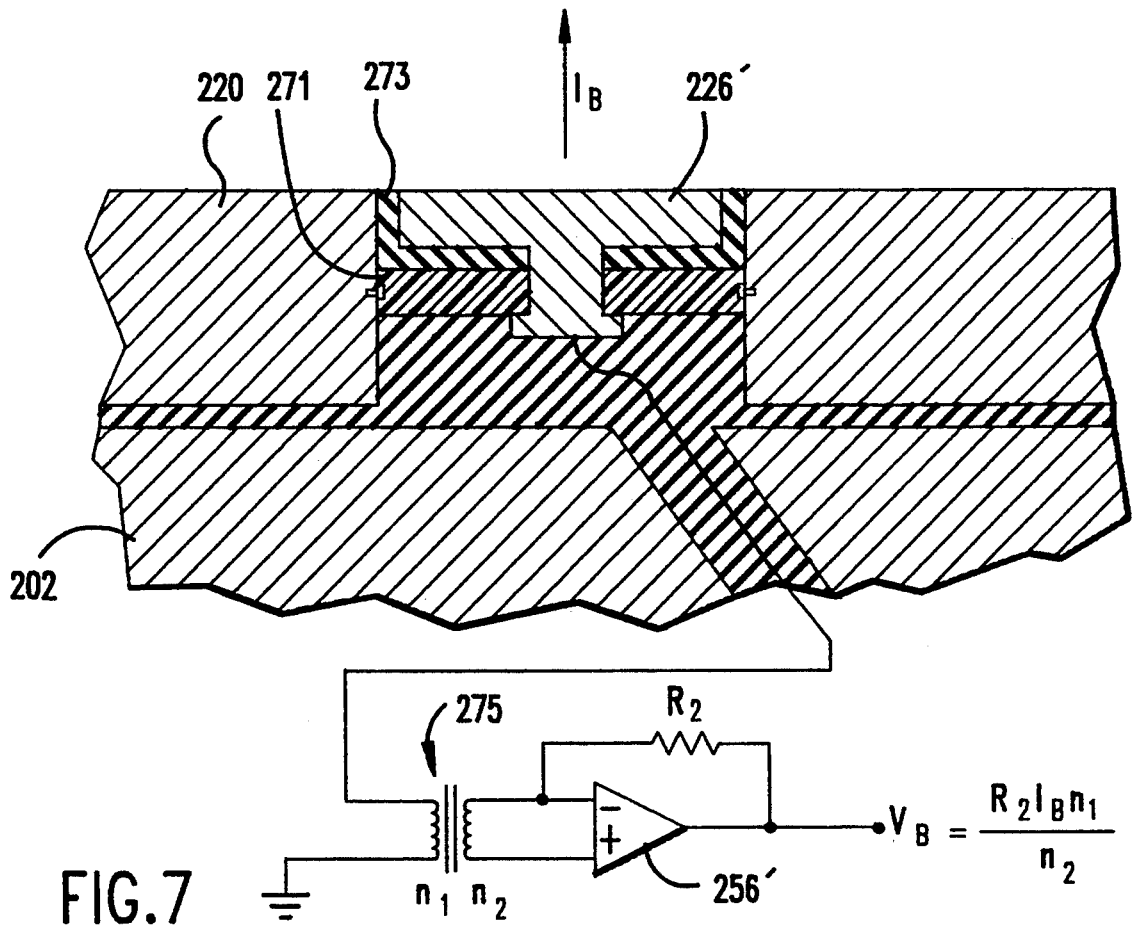
FIG. 7 is a cross-sectional view, partially in schematic form, of an electrode and associated circuitry.

Referring to FIG. 7, there is shown a diagram of a further configuration of a button electrode. The electrode body (e.g. 226') is supported on an insulating mounting frame 271 formed of a material such as epoxy fiberglass composite, and is sealed with "VITON" rubber insulating material 273. The electrode is coupled, via a bulkhead feed-through, to one end of the primary coil of a transformer 275, the other end of which is coupled to ground reference potential (e.g., the collar body). The secondary winding of transformer 275 is coupled to the inputs of an operational amplifier 256' which operates in a manner similar to the operational amplifier 256 of FIGS. 5 and 6. A feedback resistor $R_2$ is coupled between the output of the operational amplifier 256' and its inverting input, and the output is designated $V_B$. Derivation of the output voltage as a function of the electrode current $I_B$ is similar to that of the circuit of FIG. 6, except that in this case the turns ratio, secondary to primary, is $n_2/n_1$, and the expression for the output voltage is $V_B = R_2 I_B n_1/n_2$. An advantage of this electrode arrangement and circuit is that $n_1$ can be increased to increase the output voltage sensitivity to the current being measured.

Figure 8:
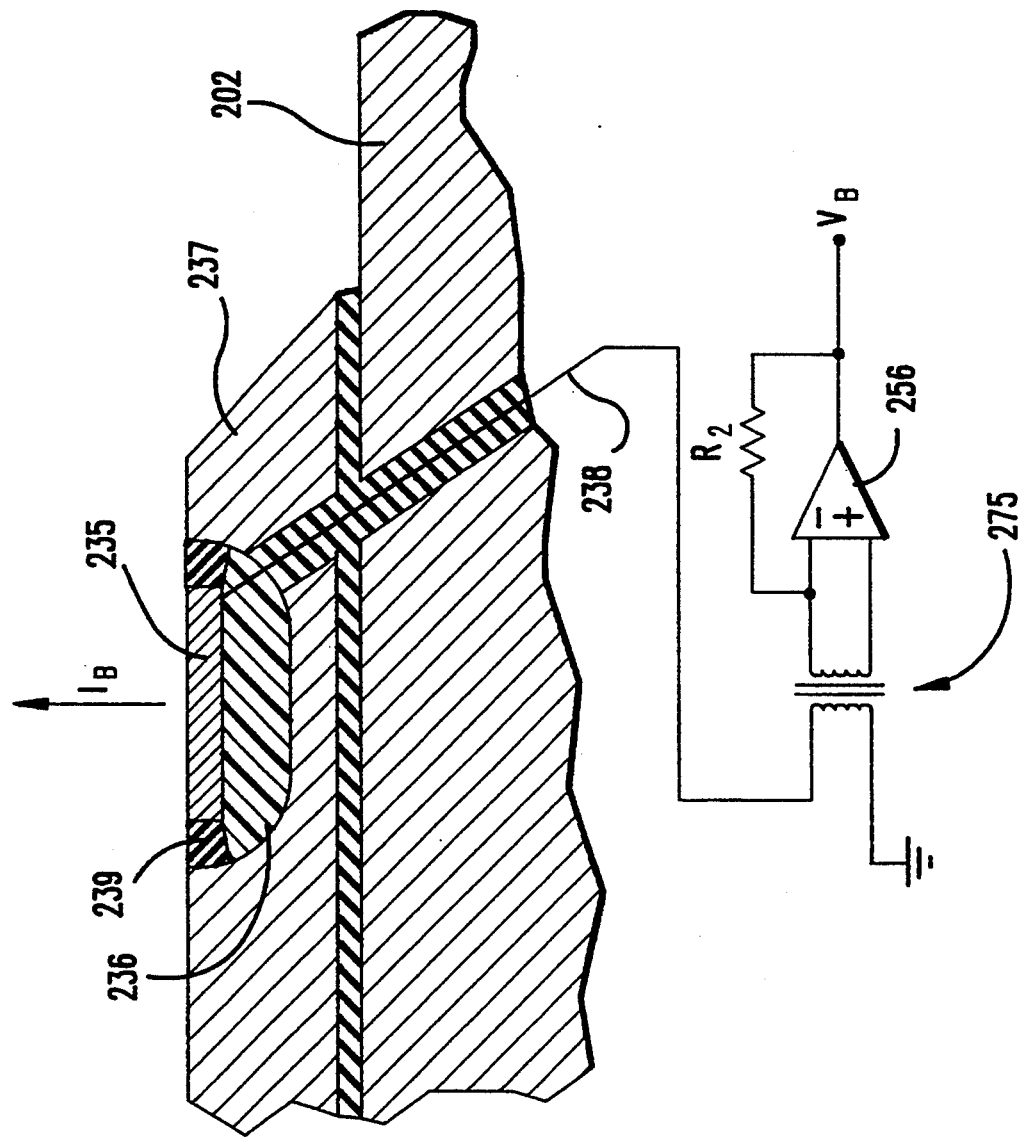
FIG. 8 is a cross-sectional view of a ring electrode that can be used in a form of the invention.

FIG. 8 illustrates a form of the ring electrode 235 utilized in the FIG. 2 configuration. The ring electrode, which can be welded into a single piece, is seated on fiberglass-epoxy insulator 236, and is sealed with viton rubber 239. A conductor 238 that can be brazed or welded to the ring electrode 235, is coupled, via a feedthrough, to circuitry similar to that of FIG. 7, with a transformer 275, an operational amplifier 256, a feedback resistor $R_2$, and an output $V_B$. The current sensing operation of this circuit is substantially the same as that of the FIG. 7 circuit.

As described in the above-referenced U.S. Pat. No. 5,235,285, the apparent resistivity of the formation is inversely proportional to the current I measured at the electrode. If the voltage at the electrode relative to the voltage of the drill collar surface above the toroidal coil transmitter coil 205 is V, the apparent resistivity is $R_{app} = kV/I$, where k is a constant that can be determined empirically or by modeling. If desired, a correction can be applied to compensate for electromagnetic skin effect.

Figure 9:
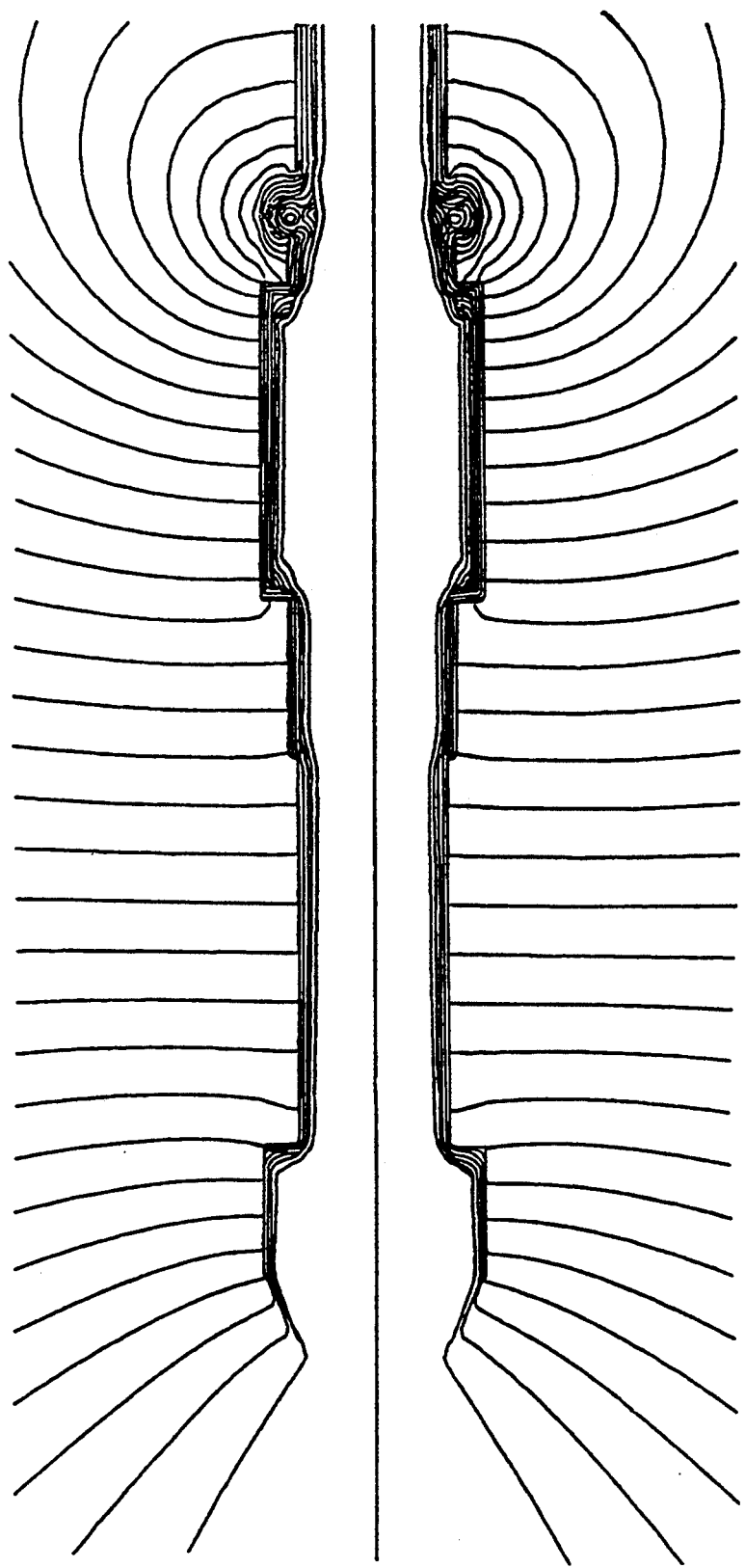
FIG. 9 is a representation of the type of current pattern obtained when the transmitting toroidal coil of FIG. 2 is energized.

FIG. 9 shows a general representation of the known type of current pattern that results from energizing the transmitter toroidal coil in a well being drilled with mud having substantial conductivity, as illustrated for example in the above-referenced U.S. Pat. No. 5,235,285. The pattern will, of course, depend on the formations' bed pattern and conductivities, the example in FIG. 9 being for the simplified case of uniform conductivity.

Figure 10:
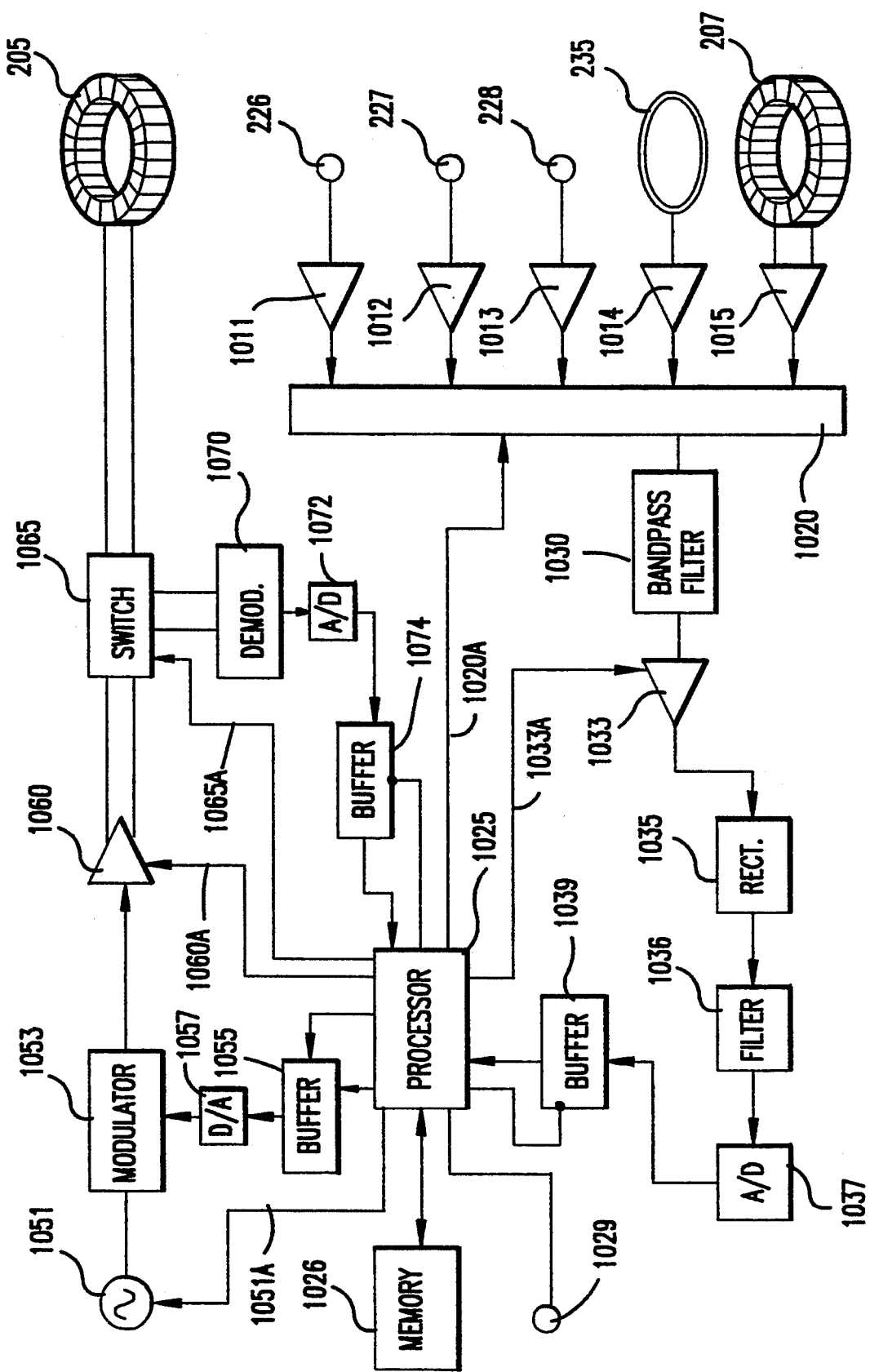
FIG. 10 is a block diagram, partially in schematic form, of the antennas, electrodes, and circuitry utilized in conjunction with the subassembly of FIG. 2.

FIG. 10 shows a block diagram of an embodiment of downhole circuitry in subassembly 200 for implementing measurements and/or for transmitting information to the surface/local communications subassembly 150, as described in the above-referenced U.S. patent application Ser. No. 786,137. The button electrodes 226, 227 and 228 and ring electrode 235 are each coupled, via the previously described sensing and amplification circuits (e.g. FIGS. 5-8, now referred to by reference numerals 1011-1014, respectively), to a multiplexer 1020. The output of the receiver toroidal coil 207 is also coupled, via a sensing and amplification circuit 1015, to the multiplexer 1020. The multiplexer 1020 is under control of a computer or processor 1025, as represented by the line 1020A. The processor 1025 may be, for example, a suitable digital microprocessor, and includes memory 1026, as well as typical clock, timing, and input/output capabilities (not separately represented). The processor can be programmed in accordance with a routine illustrated in FIG. 11. The output of multiplexer 1020 ie coupled, via a bandpass filter 1030, to a programmable gain amplifier 1033, the gain of which can be controlled by the processor 1025 via line 1033A. The output of amplifier 1033 is coupled to a rectifier 1035, a low-pass filter 1036, and then to an analog-to-digital converter 1037, the output of which is coupled to the processor 1025 via a buffer 1039 that is controlled by the processor. [This and other buffers can be part of the processor memory and control capability, as is known in the art.] The bandpass filter 1030 passes a band of frequencies around the center frequency transmitted by the transmitter toroidal coil 205. The processor 1025 controls the multiplexer 1020 to select the different receiver outputs in sequence. The gain of programmable amplifier 1033 can be selected in accordance with the receiver being interrogated during a particular multiplexer time interval and/or in accordance with the received signal level to implement processing within a desired range. The amplified signal is then rectified, filtered, and converted to digital form for reading by the processor 1025.

As described in the above-referenced U.S. Pat. No. 5,235,285, the transmitter of subassembly 200 can operate in two different modes. In a first mode, the transmitter toroidal coil 205 transmits measurement signals, and the signals received at the electrodes and the receiver toroidal coil are processed to obtain formation measurement information. In a second mode of operation, the transmitter toroidal coil 205 is utilized for communication with the transmitter/receiver in the surface/local communications subassembly 150 (FIG. 1).

A sinewave generator 1051, which may be under control of processor 1025 (line 1051A) is provided and has a frequency, for example, of the order of 100 Hz to 1 M Hz, with the low kilohertz range being generally preferred. In one operating embodiment, the frequency was 1500 Hz. The generated sinewave is coupled to a modulator 1053 which operates, when the system is transmitting in a communications mode, to modulate the sinewave in accordance with an information signal from the processor 1025. The processor signal is coupled to modulator 1053 via buffer 1055 and digital-to-analog converter 1057. In the illustrated embodiment the modulator 1053 is a phase modulator. The output of modulator 1053 is coupled to a power amplifier 1060, which is under control of processor 1025 (line 1060A). The output of power amplifier 1060 is coupled, via electronic switch 1065, to the transmitter toroidal coil antenna 205. Also coupled to the toroidal coil antenna 205, via another branch of electronic switch 1065, is a demodulator 1070 which, in the present embodiment is a phase demodulator. The output of demodulator 1070 is, in turn, coupled to analog-to-digital converter 1072 which is coupled to the processor 1025 via buffer 1074. The processor controls electronic switch 1065, depending on whether the toroidal coil antenna 205 is to be in its usual transmitting mode, or, occasionally, in a receiving mode to receive control information from the surface/local communications subassembly 150.

Figure 11:
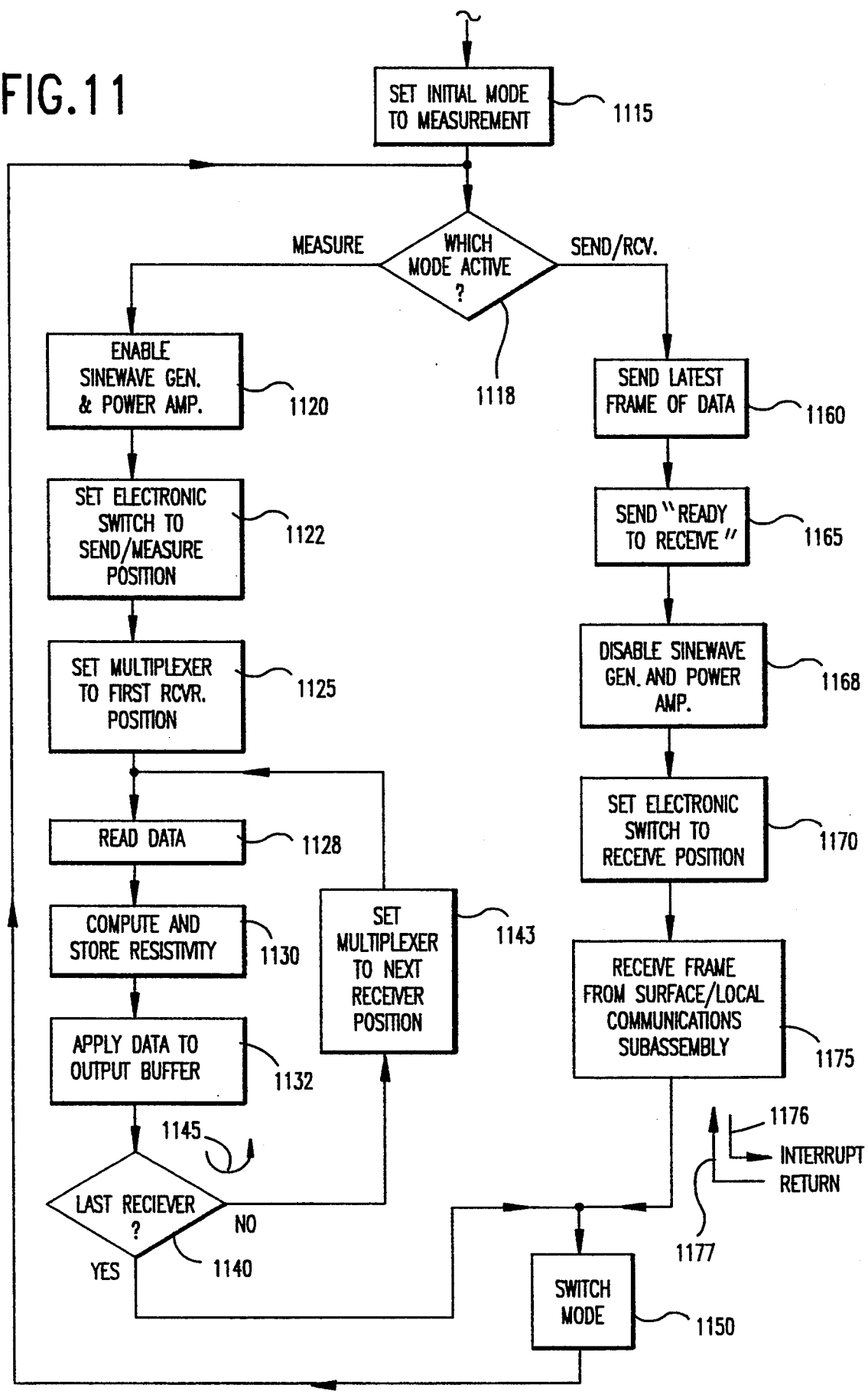
FIG. 11 is a flow diagram of an embodiment of a routine for programming the processor of the FIG. 10 circuitry.

Referring to FIG. 11, there is shown a flow diagram of a routine for programming the processor 1025 as first described in the above-referenced U.S. Pat. No. 5,235,285. In the example of the routine set forth, functions are performed or controlled in a repetitive sequential fashion, but the program may alternatively be set up with a routine that handles the indicated tasks on a prioritized basis, or with a combination of sequential and prioritized functions. Also, the processor may be multi-ported or multiple processors may be used. The routine has two basic modes; a "measurement" mode wherein the toroidal coil antenna 205 is transmitting for the purpose of obtaining measurement signals at the receiving electrodes 226–228 and 235 and the receiving toroidal coil antenna 207, and a "local communications" mode wherein the toroidal coil antenna 205 is utilized to transmit and/or receive modulated information signals to and/or from a toroidal coil antenna located in the surface/local communications subassembly 150 (FIG. 1), for ultimate communication with equipment at the earth's surface via a mud pulse telemetry equipment which is part of the subassembly 150. The block 1115 represents the initializing of the system to the measurement mode. Inquiry is then made (diamond 1118) as to which mode is active. Initially, as just set, the measurement mode will be active, and the block 1120 will be entered, this block representing the enabling of the sinewave generator 1051 and the power amplifier 1060 (FIG. 10). The electronic switch 1065 is then set to the measurement/send position (block 1122) [i.e., with the toroidal coil antenna 205 coupled to the power amplifier 1060], and the multiplexer 1020 is set to pass information from the first receiver (block 1125), for example the closest button electrode 226. The data is then read (block 1128) and the resistivity, as measured by the electrode from which the data has passed, is computed [for example in accordance with the relationships set forth above in conjunction with FIGS. 5–8] and stored (block 1130), and can be sent to output buffer 1055 (block 1132). Inquiry is then made (diamond 1140) as to whether the last receiver has been interrogated. If not, the multiplexer 1020 is set to pass the output of the next receiver (for example, the button electrode 227), as represented by the block 1143. The block 1128 is then re-entered, and the loop 1145 continues until data has been obtained and processed from all receivers. When this is the case, the operating mode is switched (block 1150), and inquiry is made as to which mode is active. Assuming that the local communications mode is now active, the block 1160 is entered, this block representing the transmission of the latest frame of data to the main communications subassembly. In particular, data from the processor 1025 (or from the optional buffer 1055) is coupled to the modulator 1053 to modulate the sinewave output of generator 1051 for transmission by antenna 205. At the end of a frame of data, a "ready to receive" signal can be transmitted (block 1165). The sinewave generator and power amplifier are then disabled (block 1168), and the electronic switch 1065 is set to the "receive" position. [i.e., with the toroidal coil antenna 205 coupled to the demodulator 1070] (block 1170). A frame of information can then be received via buffer 1074, as represented by the block 1175. During this time, as represented by the arrows 1176 and 1177, other processor computations can be performed, as desired. The block 1150 can then be re-entered to switch the operating mode, and the cycle continues, as described. The information received from the surface/local communications subassembly can be utilized in any desired manner. For description of the surface/local communications subassembly, reference can be made to the above-referenced U.S. Pat. No. 5,235,285.

In general, the resistivity obtained from the electrodes in the previously described manner is an accurate indication of the resistivity of formations in the region immediately surrounding the electrode, but under certain conditions this may not be the case. As noted above, Applicant recognizes that the measurement at an electrode in the described type of system is, at least to some degree, determined by the total current distribution into the overall body of the apparatus which, in the described system, is the drill collar and the conductive drill string coupled therewith. The total current distribution, in turn, depends to some extent on the formation resistivity along the entire length of the drill string. A problem arises when the current measured at the indicated electrode(s) is affected to a substantial degree by formations a meaningful distance from the region of the electrode, and such formations have resistivities that are different than the resistivity of the formations in the region of the electrode(s). For example, a problem occurs in the logging-while-drilling apparatus when the measuring electrode(s) is traversing a resistive bed and the drill bit cuts into a more conductive bed. When this happens the current being emitted from the electrode decreases, falsely indicating a more resistive formation in the region of the electrode. As described further below, other conditions can give rise to errors in resistivity indications.

Figure 12:
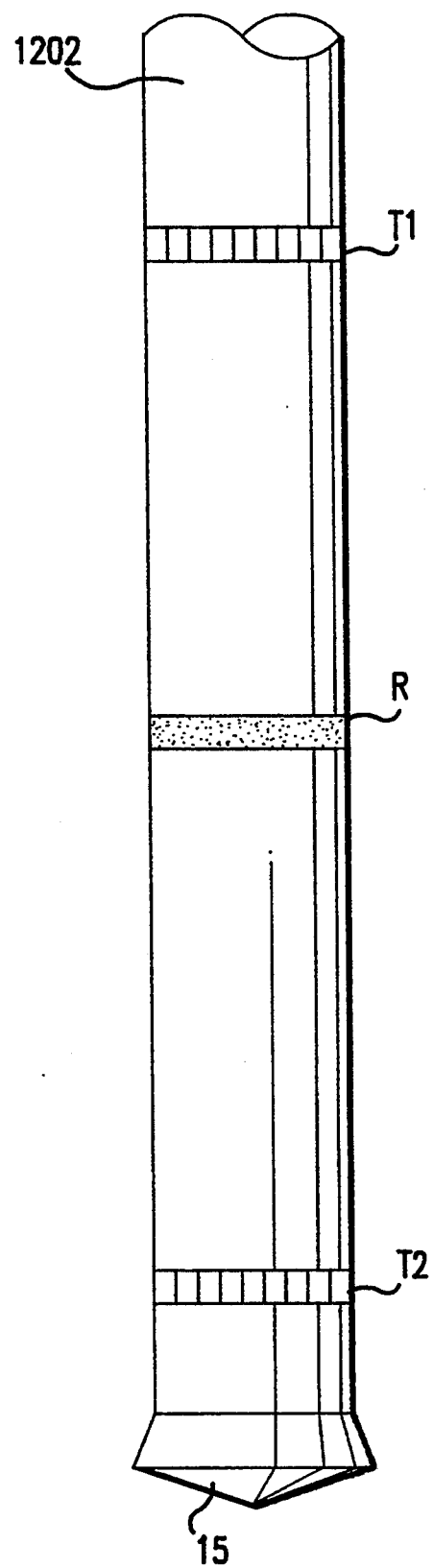
FIG. 12 is a simplified diagram of a drill collar, upper and lower toroidal transmitters, and a ring electrode, which is useful in understanding a form of the invention.

Consider the arrangement of FIG. 12, which has a toroidal transmitter T1 and a ring electrode R on a conductive body 1202 which is like the drill collar 202 in a logging-while-drilling setup of the general type shown in FIGS. 1-3. A further toroidal transmitter T2, also called a lower transmitter, is located near the drill bit. For this example, the lower transmitter T2 is about 24 inches from the end of the bit 15, the upper transmitter T1 is about 84 inches from the end of the bit, and the ring electrode is equidistant from the transmitters, i.e., about 54 inches from the end of the bit. The logging device is assumed to be in a formation of resistivity 2000 ohm-m having a bed of resistivity 20 ohm-m and a specified thickness Simulated resistivity logs for five such bed thicknesses [8, 4, 2, 1 and 0.5 feet] are shown left-to-right in FIG. 13. [This and other simulated logs hereof are computed without consideration of borehole effect, which will be small if the transmitter-to-electrode spacing is larger compared to the standoff between the electrode and the borehole wall.] The simulated resistivity logs, as a function of the depth of ring R, are computed for transmission by the upper transmitter T1 (solid line) and by the lower transmitter T2 (dotted line). [As above, resistivity is inversely proportional to the measured ring current.] For operation with the upper transmitter, relatively large horn-shaped artifacts labelled A1 through A5 can be observed to occur when the logging tool enters the bed; that is, in this case, when the bit first cuts into the bed. The length of this artifact is approximately equal to the distance from the ring to the bit. There is also an artifact on the lower side of the bed for the thin beds, labelled B1 through B3. This artifact has a length approximately equal to the transmitter-ring spacing minus the bed thickness and so is absent for thick beds greater in extent than the transmitter receiver distance. The simulated ring resistivity computed when the lower transmitter is active (dotted line) has initial artifacts which roughly oppose A1 through A5, and other serious distortions.

Figure 14:
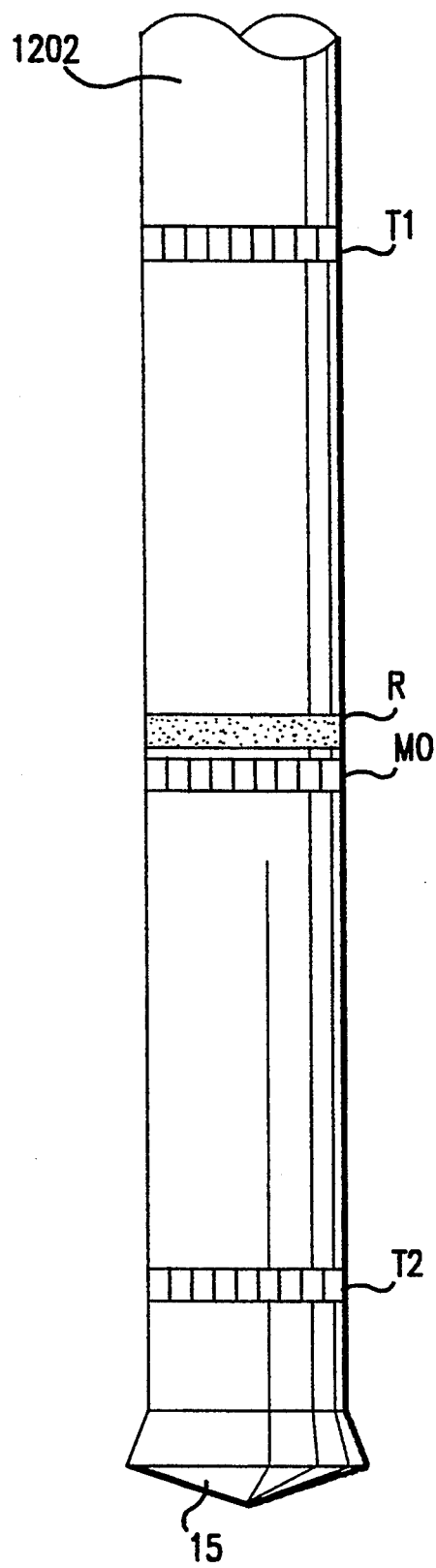
FIG. 14 illustrates a structure like that of FIG. 12, but for an embodiment with a monitor toroidal receiver adjacent the ring electrode.

Consider next the arrangement of FIG. 14, which is like that of FIG. 12, but also has a receiver (or monitor) toroid M0 at about the position of the ring electrode R to monitor the axial current flowing up or down through the conductive body at the position of the ring R. The axial current which is induced by T1 is linear with respect to the voltage induced on the drill collar and inverse to the resistivity of the earth formation surrounding the tool. The axial current which is induced by T2 is linear with respect to the voltage induced on the drill collar by T2 and inverse to the resistivity of the earth formation surrounding the tool. Assume that the excitation voltage of the upper transmitter is fixed while the excitation voltage of the lower transmitter is adjustable. The net axial current which flows along the drill collar at any point is the linear superposition of the induced current from T1 and T2. Assume that the voltage of T2 can be adjusted so that the net axial current flowing through the monitor toroid M0 is zero. This will require that the current induced by T2 be approximately opposite in phase to the current induced by T1, so that when the upper transmitter is driving current down the tool, the lower transmitter is driving the current up, and vice versa. All of the current leaving the tool between the lower transmitter and the monitor returns to the tool below the lower transmitter while all of the current leaving the tool between the upper transmitter and the monitor returns to the tool above the upper transmitter. This has the effect of isolating the region of the tool above the monitor from the region of the tool below the monitor since no current flows between them, either on the collar or through the formation. As a result, the resistivity determined from the ring current more accurately represents the resistivity of formations surrounding the ring R.

A similar result can be obtained by energizing the transmitters separately and computing a compensated ring current. In the arrangement of FIG. 14 [or that of FIG. 15, which includes a lower receiving or monitoring toroid M2, to be subsequently considered], the upper position is designated 1, the lower position is designated 2, and the center position is designated 0. The ring and toroid currents when the upper transmitter is operated at an arbitrary but fixed voltage are $R_1$, $M_{01}$, and $M_{21}$ and the ring and toroid currents when the lower transmitter is operated at the same voltage are $R_2$, $M_{02}$, and $M_{12}$. Consider a compensated current of the form:

$$R_c = \frac{1}{M_{02}} (M_{02} R_1 + M_{01} R_2) \tag{1}$$

or $$R_c = R_1 + \frac{M_{01}}{M_{02}} R_2 \tag{1a}$$

In equation (1a), the ratio $M_{01}/M_{02}$ is the adjustment factor for the lower transmitter to achieve the condition of zero axial current at MO. The expression $R_1 + M_{01}/M_{02} R_2$ is the ring current for the condition of zero axial current.

The two terms in equation (1a) add. This is due to the fact that operating the two transmitters in opposition in order to achieve a zero axial current at the monitor toroid causes an increase in the ring current. That is, when the upper transmitter drives a current down the mandrel, current flows out of the ring. Similarly when the lower transmitter drives current up the mandrel, it also causes current to flow out of the ring. The implication of this processing on the noise is that, since the terms add, the noise in the output is not amplified as would be the case if one took a small difference between two large numbers.

Figure 13:
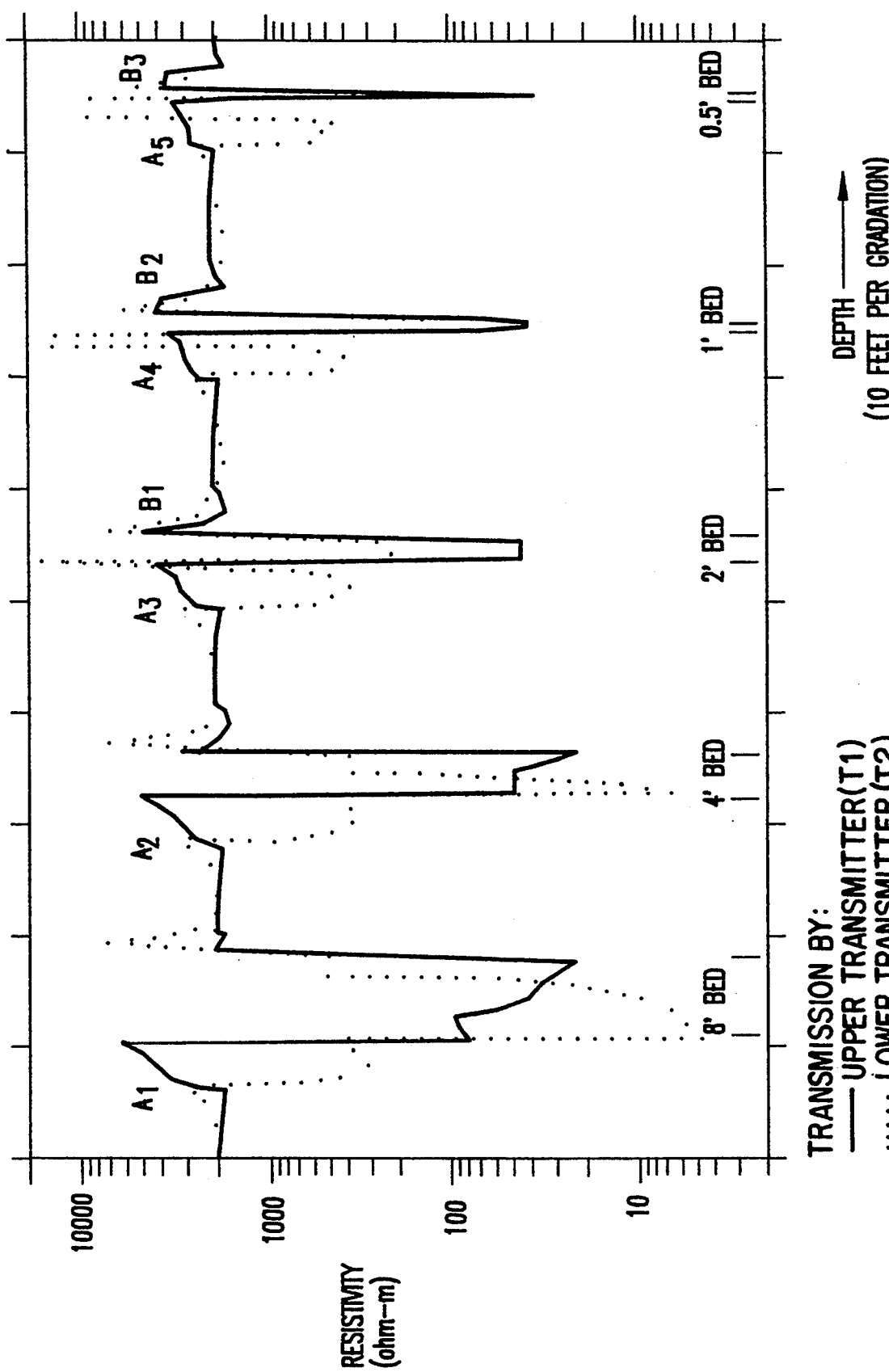
FIG. 13 is a graph of resistivity versus depth in a series of conductive beds for measurement at the ring electrode of FIG. 12, with transmission by the upper and the lower transmitters thereof.
Figure 16:
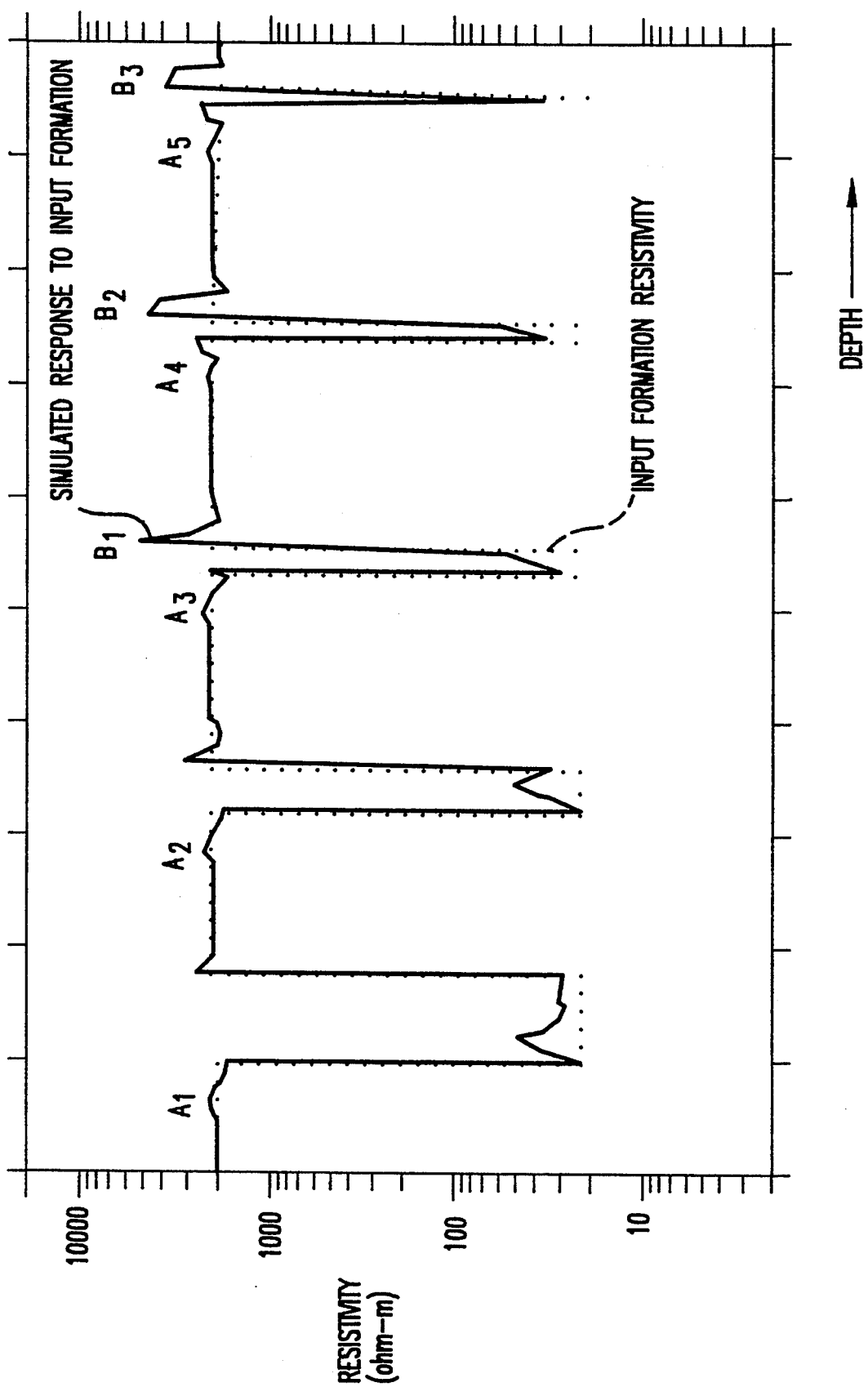
FIG. 16 is a graph of resistivity versus depth in a series of conductive beds for an improvement in accordance with an embodiment of the invention.

FIG. 16 shows the response [resistivity, inversely proportional to compensated ring current] for the same beds as in FIG. 13. The artifact A1 through A5 (of FIG. 13), which occurs as the tool enters the bed, is greatly reduced. The smaller artifact B1 through B3 on the downside of the thinner beds is almost unchanged. The shape of the log within the bed is improved, but could still stand improvement.

Figure 17:
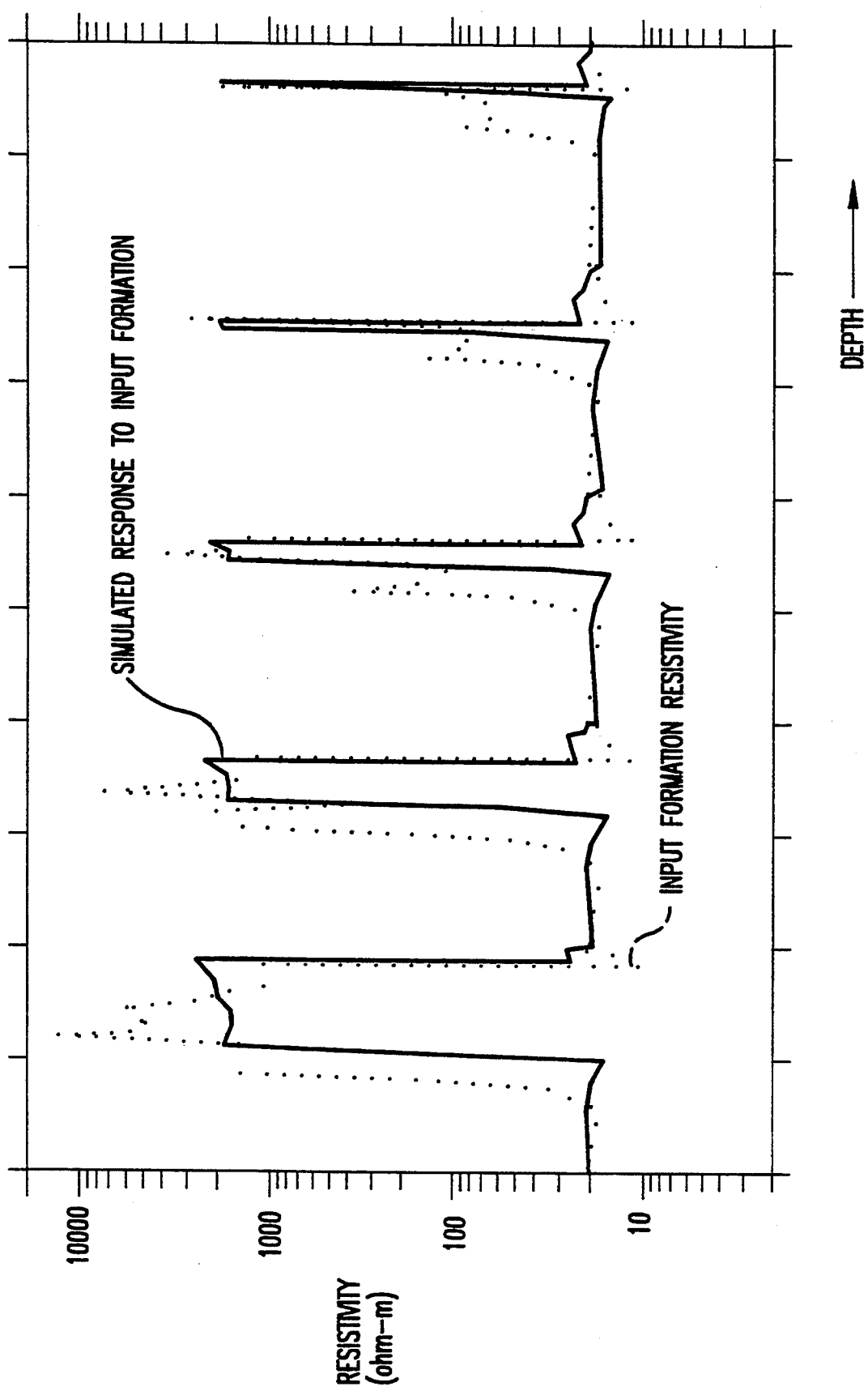
FIGS. 17 and 18 are graphs of resistivity versus depth for uncompensated and compensated logs in resistive beds.
Figure 18:
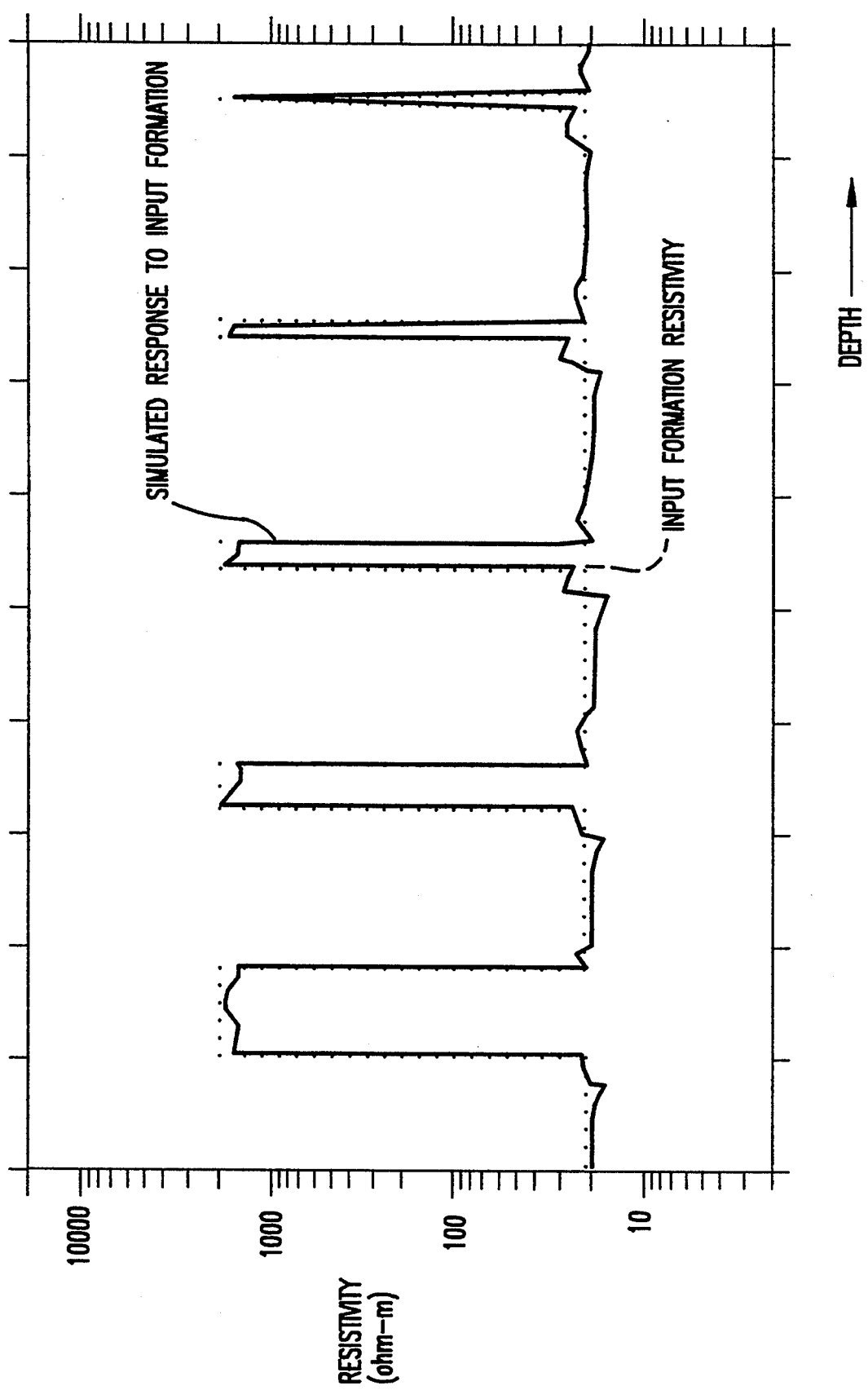

FIGS. 13 and 16 illustrate performance when relatively conductive beds are encountered. FIGS. 17 and 18 illustrate performance in thin beds that are more resistive than the formations in which they are located. The contrast ratio is again 100 to 1 (2000 ohm-m beds in 20 ohm-m formations). FIG. 17 shows that in this case the uncompensated log using the upper transmitter is reasonably good without compensation, and FIG. 18 shows the improvement using the indicated compensation of equation (1).

Figure 19:
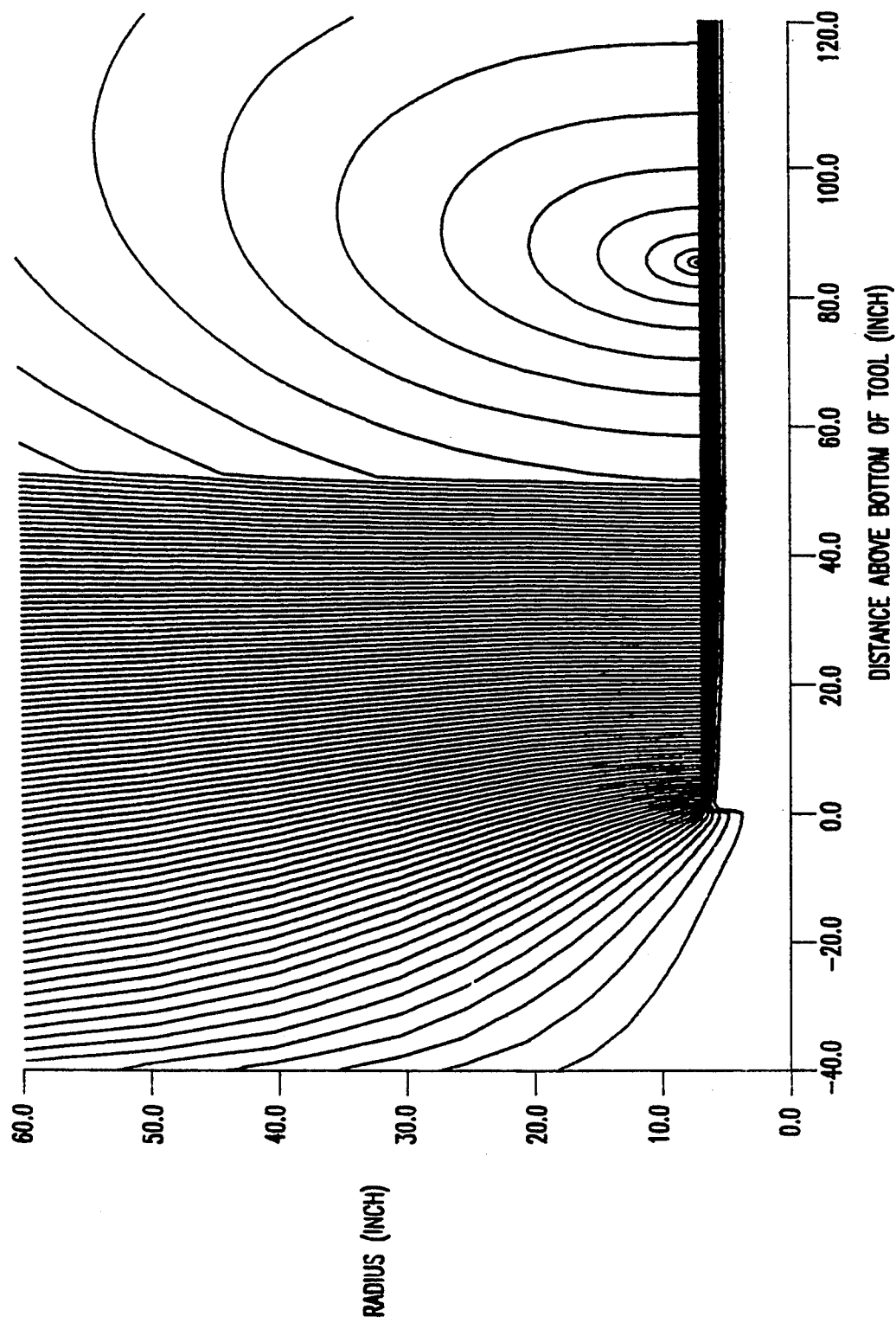
FIG. 19 illustrates current path lines for the device of FIG. 12 adjacent a conductive bed, with transmission by the upper transmitter.
Figure 20:
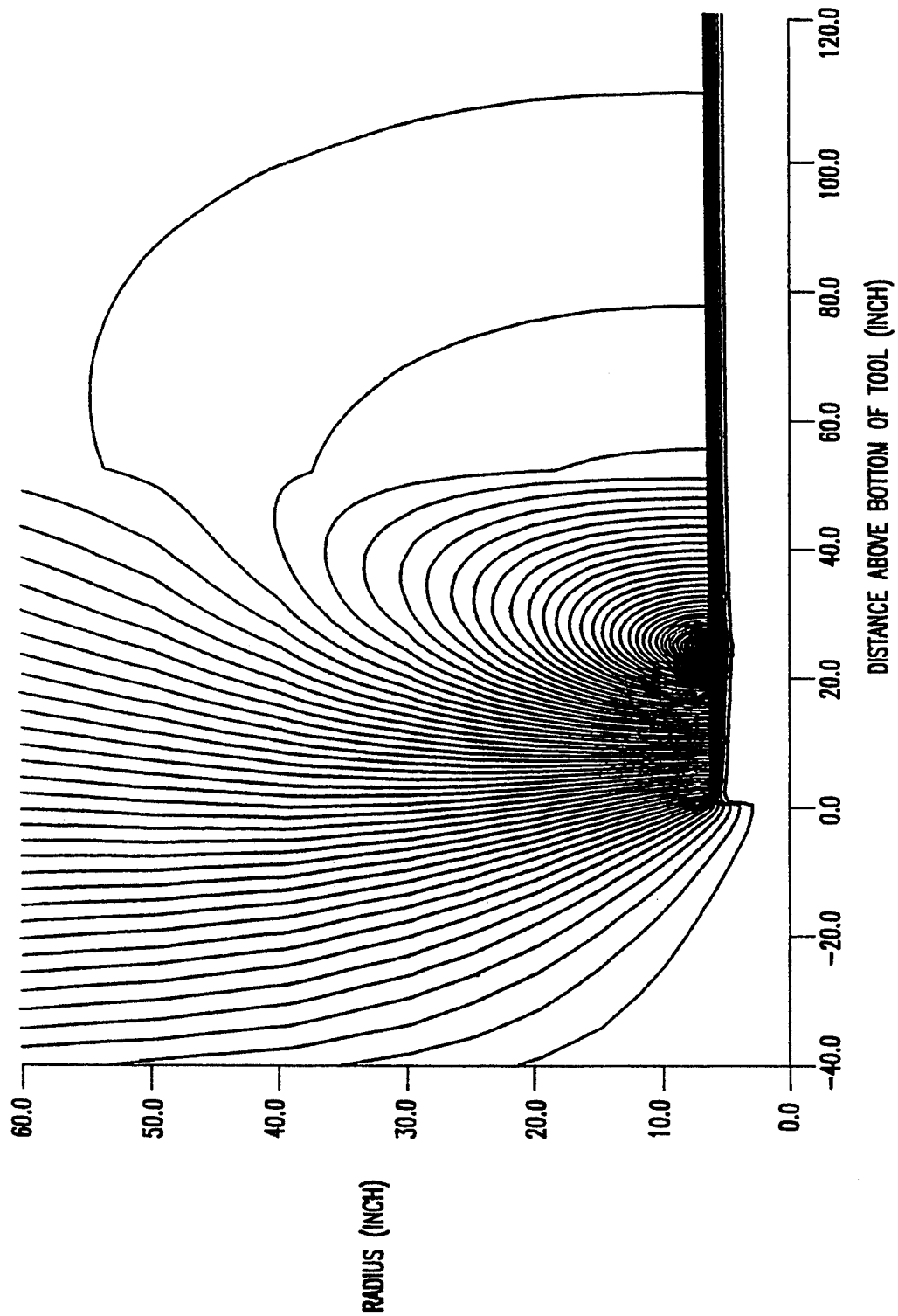
FIG. 20 illustrates current path lines for the device of FIG. 12 adjacent a conductive bed, with transmission by the lower transmitter.
Figure 21:
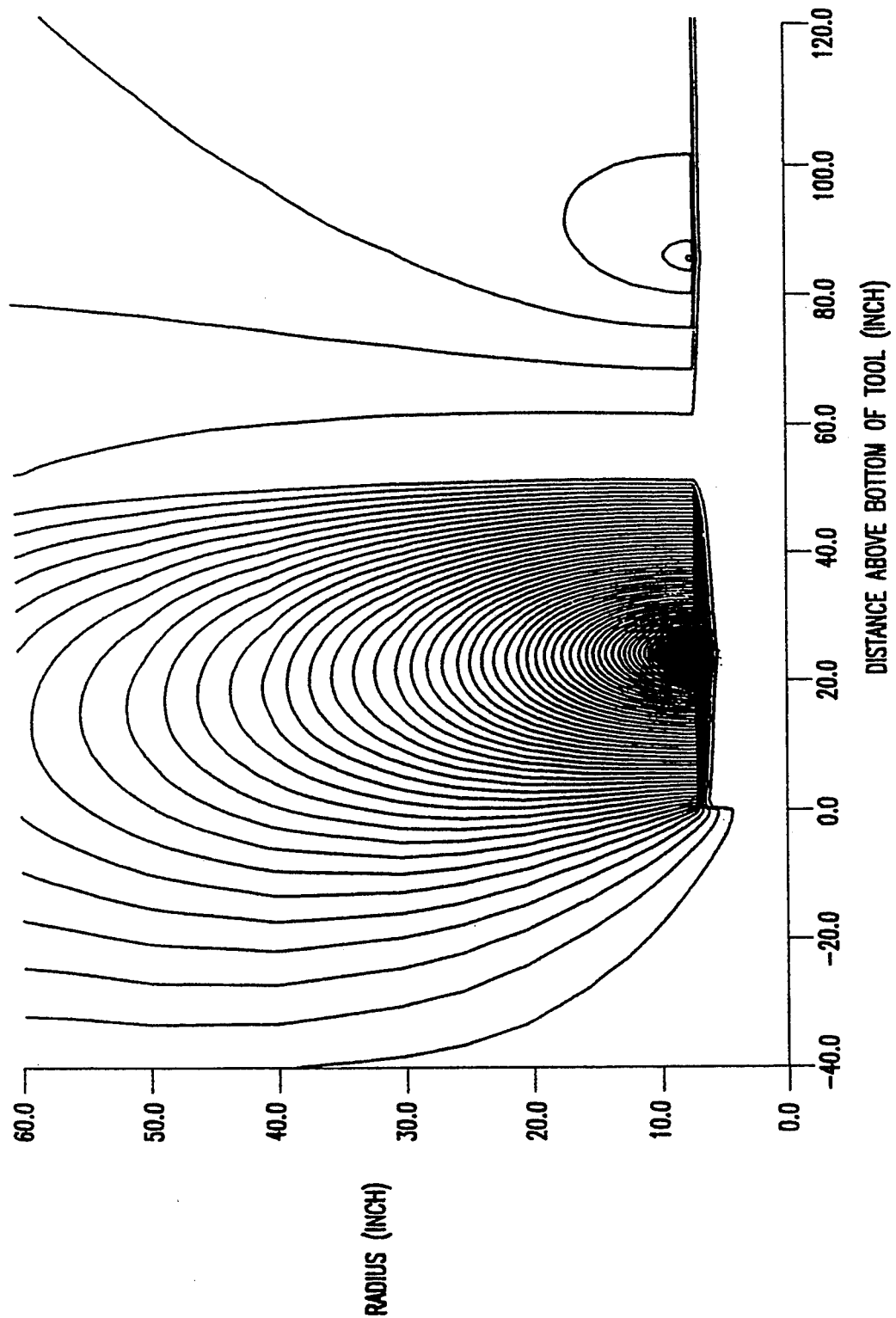
FIG. 21 illustrates current path lines for the same situation as in FIGS. 19 and 20, with currents from the two transmitters superposed.

To better understand the compensation approach, reference can be made to FIGS. 19, 20, and 21, which illustrate current path lines for a tool just above an 8 foot thick conductive bed. In FIG. 19 transmission is from the upper transmitter (at 84 inches on the depth scale) and the ring electrode is just above the bed boundary (the ring electrode being at 54 inches on the depth scale), the resistivity contrast ratio being 10 to 1. [A lower contrast ratio than before is used to facilitate visualization of the current line plots.] It is seen in FIG. 19 that the current lines emerge from the bed and curve upward into the more resistive shoulder. This distortion accounts for the horn-shaped artifacts such as A1 in FIG. 13. FIG. 20 shows the same situation, but with transmission from the lower transmitter, T2. FIG. 21 illustrates the compensated situation, with current from the two transmitters superposed. The current paths near the borehole at about the position of the ring are substantially parallel to the bed and are not distorted by the presence of the bed. The fact that the current paths are substantially independent of the presence of the bed below the ring electrode explains the improved response.

The monitor toroid M0 should preferably be at substantially the same position as the ring electrode R to obtain excellent compensation. [An arrangement of ring, toroid, and protective covering ring, as first shown above in FIG. 3, will effectively put a ring and toroid receiver at substantially the same receiver position.] However, even if there is some distance between them, improvement will be realized from the indicated compensation.

The condition of zero axial current at the monitor M0 fixes the ratio of the voltages generated by transmitter T1 and transmitter T2 or, equivalently, the ratio of factors to be applied to the respective ring currents $R_1$ and $R_2$. It does not set the overall level of the transmitter voltages. Choice of the prefactor as $1/M_{02}$ corresponds to a fixed voltage at T1 and a voltage at transmitter T2 of $M_{01}/M_{02}$. This can be seen from equation (1a). If instead of $1/M_{02}$ one uses a prefactor of $1/M_{01}$, this corresponds to the lower transmitter producing a fixed voltage, while the upper transmitter produces a voltage $M_{02}/M_{01}$ times as large. In this case, one is trying to electrically remove the effect of the upper portion of the tool. This produces an inferior log from what corresponds to a short asymmetrical tool with poor response.

Figure 15:
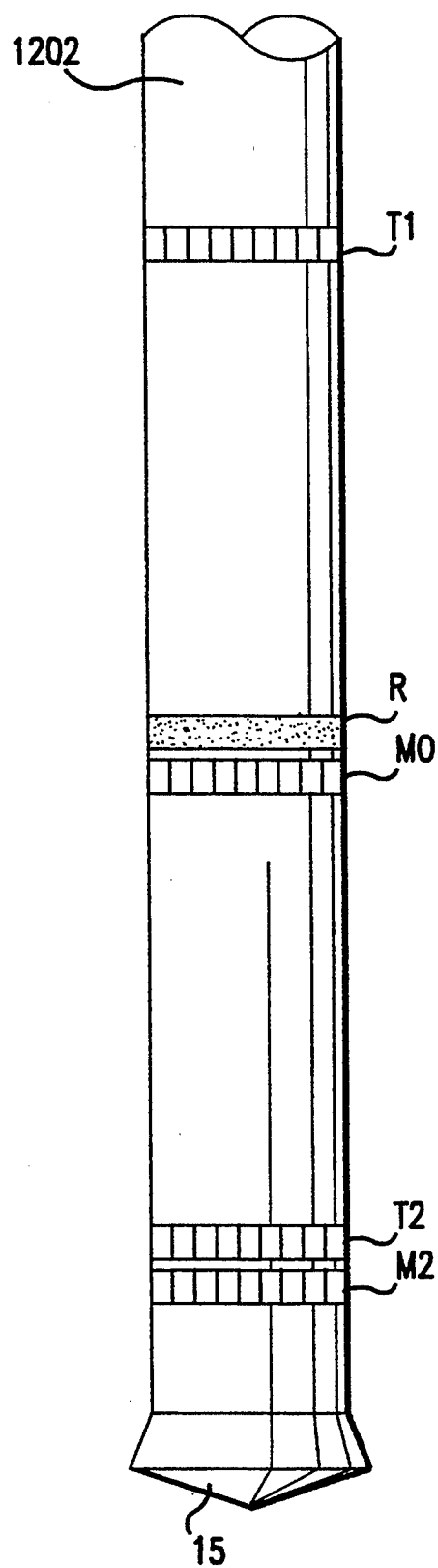
FIG. 15 illustrates a structure like that of FIG. 14, but for an embodiment with a further monitor toroidal receiver adjacent the lower transmitter.

At present, the most preferred multiplying factor is $1/M_{21}$, where $M_{21}$ is the current produced by the upper transmitter measured at the lower monitor toroid M2 (which is at substantially the same position as the lower toroidal transmitter T2—see FIG. 15). [By reciprocity, $M_{21}$ is equal to the current $M_{12}$ that would be produced by the lower transmitter measured at an imaginary monitor $M_1$ located at the position of the upper transmitter.]

Figure 22:
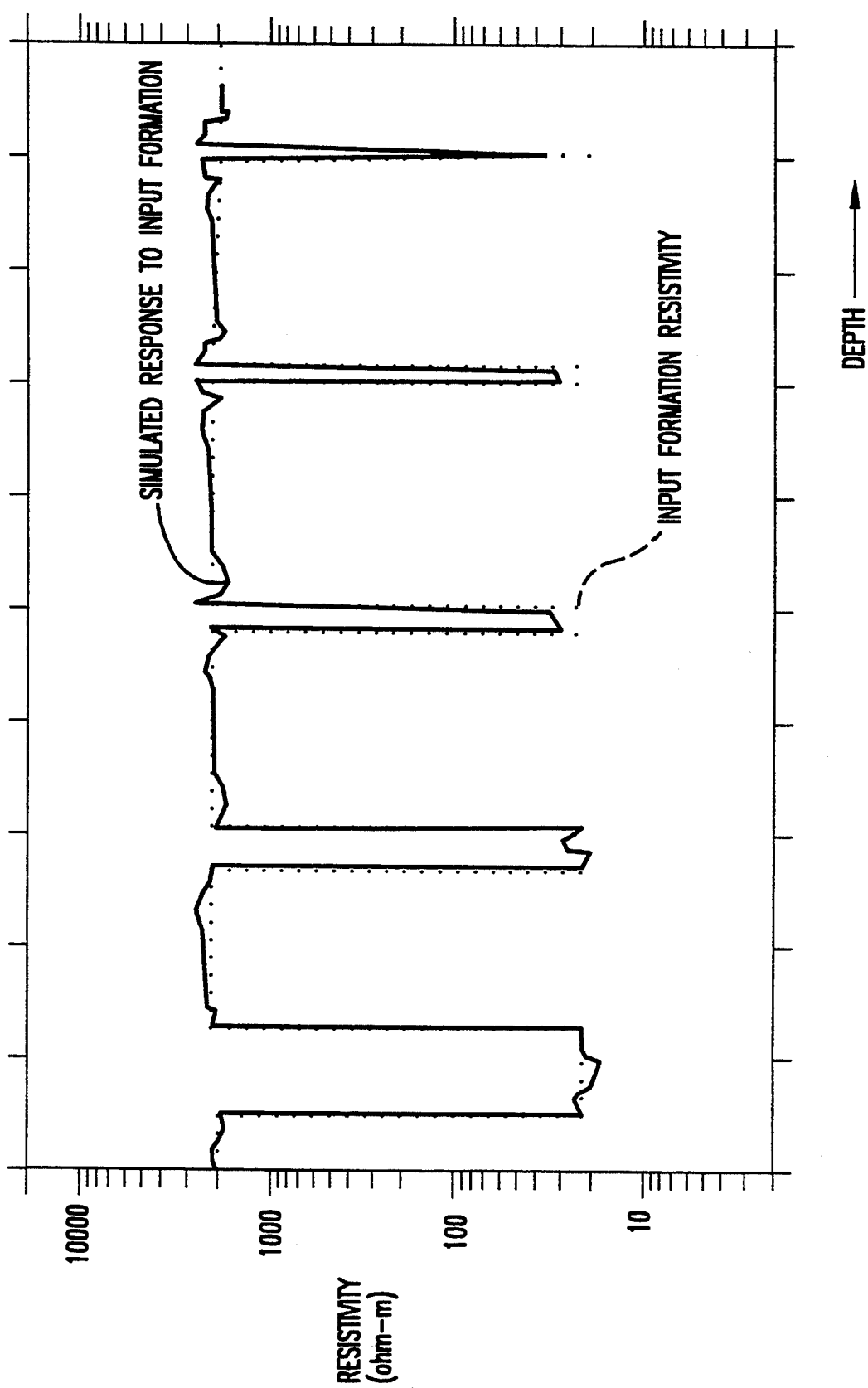
FIG. 22 is a graph of resistivity versus depth for a series of conductive beds, with resistivity obtained using the compensated ring current of equation (2) in accordance with an embodiment of the invention.
Figure 23:
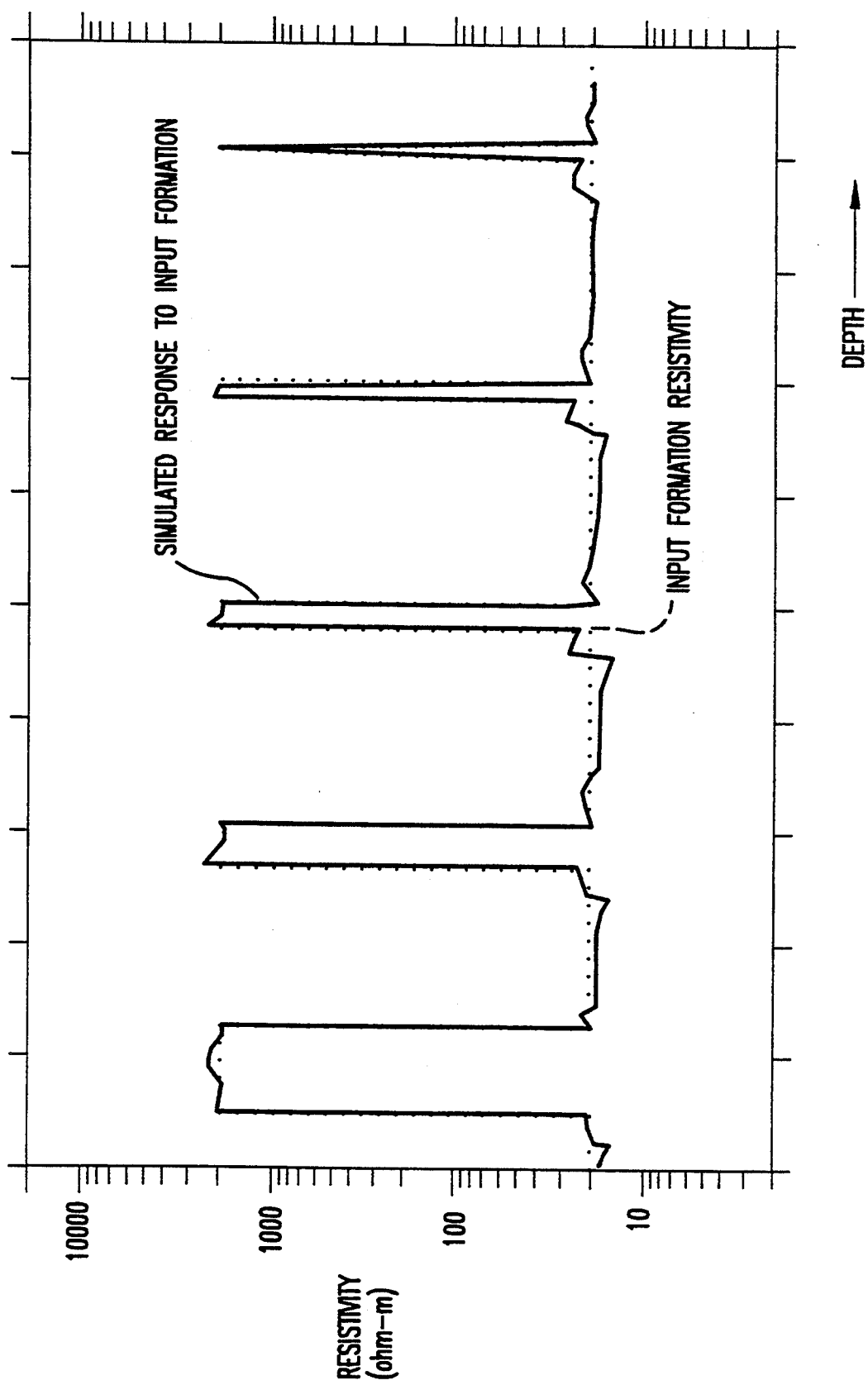
FIG. 23 is a graph of resistivity versus depth for a series of resistive beds, with resistivity obtained using the compensated ring current of equation (2) in accordance with an embodiment of the invention.

Logs produced using this compensation, that is, with the compensated ring current $$R_c = \frac{1}{M_{21}} (M_{02} R_1 + M_{01} R_2) \qquad (2)$$

are shown in FIGS. 22 and 23. FIGS. 22 and 23 are for the tool arrangement previously described, with FIG. 22 having conductive beds and FIG. 23 having resistive beds. In both cases, as in previous logs, the contrast ratio is 100 to 1. The logs match well to the bed patterns, with only small artifacts.

There is another way to visualize the compensation represented by equation (2), in terms of both transmitters operating at adjustable levels. Transmitter T1 operates at a relative level of $M_{02}/M_{21}$. This is the ratio of the current from the lower transmitter measured at the central monitor divided by the current measured at the upper transmitter. Thus, it is sensitive to the leakage of current between the upper transmitter and the ring. Similarly, the lower transmitter operates at a relative level $M_{01}/M_{21}$ which is the ratio of currents from the upper transmitter measured at the central monitor divided by the current measured at the lower transmitter. This is sensitive to the leakage of current between the lower transmitter and the ring. Thus both transmitters are operated to compensate for leakage between that transmitter and the monitor.

The foregoing assumes that the ratio $M_{02}/M_{12}$ precisely compensates for the effect of "shielding" by a conductive bed between the upper transmitter and the ring electrode. The tacit assumption is that the conductive regions have the same effect on the leakage of current between the ring electrode and the upper transmitter from the lower transmitter as they do on the "shielding" of the ring from the upper transmitter. This is true to first order.

A general expression can be set forth in which one term contains a factor times $R_1$ and the second term contains a factor times $R_2$. These factors are measures of leakage and are functions of the ratios of monitor currents as follows:

$$R_c = \qquad (3)$$

$$F_1\left(\frac{M_{01}}{M_{12}}, \frac{M_{02}}{M_{12}}, \frac{M_{01}}{M_{02}}\right) R_1 + F_2\left(\frac{M_{01}}{M_{12}}, \frac{M_{02}}{M_{12}}, \frac{M_{01}}{M_{02}}\right) R_2,$$

where $F_1$ and $F_2$ are compensation functions, and the requirement of zero axial current can be relaxed. Further generalization can be achieved by adding additional transmitters and monitors and so making the functions $F_1$ and $F_2$ more general.

It can be noted that leakage can be practically eliminated by covering the region between the transmitters and the electrode with an insulating material. When combined with the described compensation technique, this can provide an excellent resistivity log. A drawback is the fragility of the insulating material in a logging-while-drilling application. Also, the resultant measurement has more response close to the tool, and a far larger borehole effect.

Figure 24:
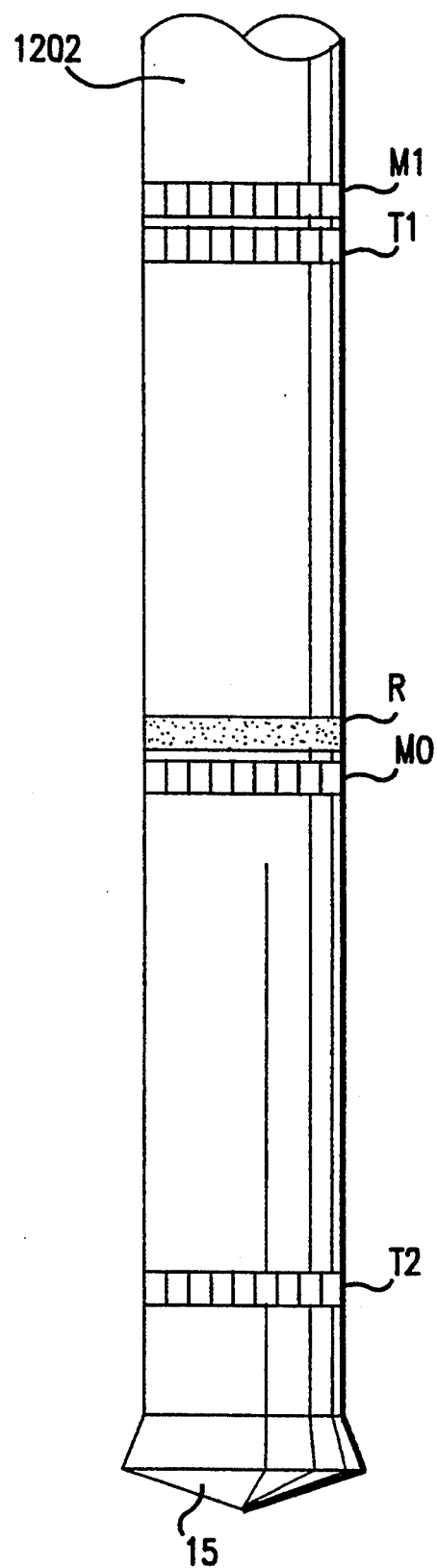
FIG. 24 is a variation of the embodiment of FIG. 15 wherein a further monitor toroidal antenna is located adjacent the upper transmitter.

FIG. 24 illustrates an embodiment which is similar to that of FIG. 15, but wherein the toroidal monitor M2 at the lower transmitter position is replaced by the toroidal monitor M1 at the upper transmitter position. By reciprocity, $M_{12}$ (signal at M1 with transmitter T2 energized) can be measured and will provide substantially the same value as $M_{21}$, for use in equation (2). The principle of reciprocity would also permit the reversal of position of other transmitter/receiver combinations from which signals are obtained. For example, a further transmitter T0 could be provided adjacent the ring electrode to be used in conjunction with a monitor toroidal antenna at the bottom position, and the monitor signal obtained from this transmitter/receiver would be equivalent, by reciprocity, to the previously indicated $M_{01}$.

Figure 25:
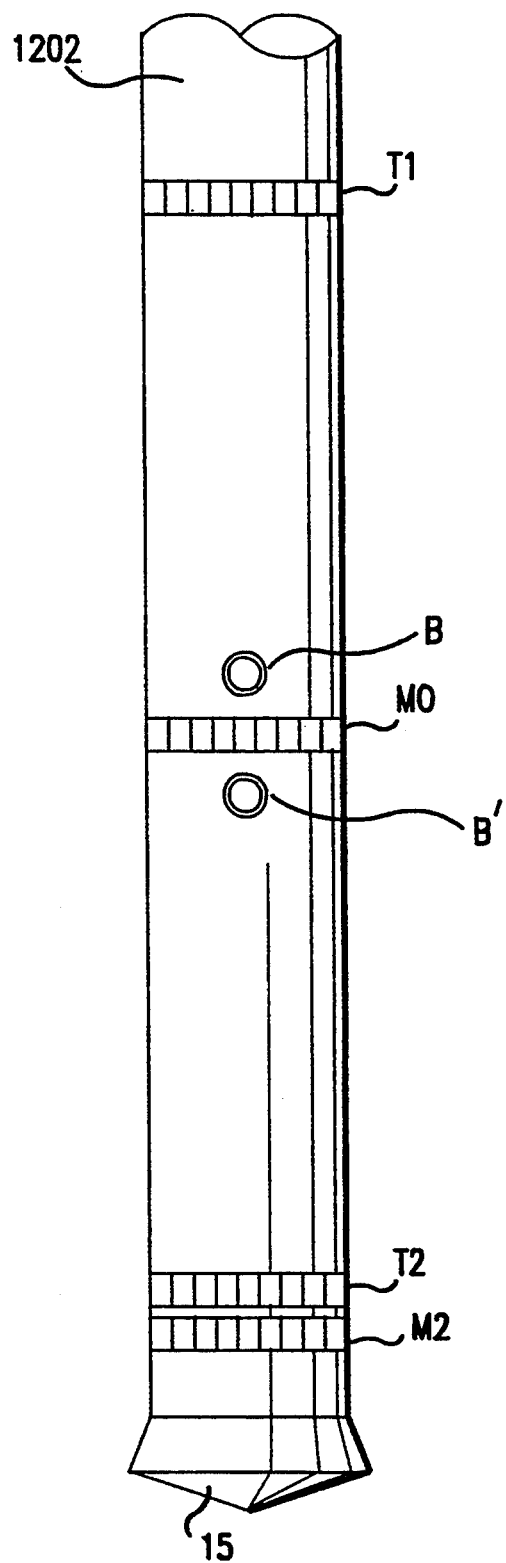
FIG. 25 illustrates a further embodiment having two button electrodes adjacent a monitor toroidal antenna.

FIG. 25 illustrates an embodiment like that of FIG. 15, but with a button electrode B (which may be of the type previously described) replacing the ring electrode R. As described above, azimuthal resistivity information can be obtained from the button electrode. Typically one or more button electrodes and/or one or more ring electrodes may be employed, in conjunction with one or more monitor toroids such as M0. A second button electrode, B', is shown in FIG. 25. The described type of compensation can improve the vertical response of multiple electrodes (which provide different depths of investigation) and make their vertical responses more similar. Different depths of investigation can also be obtained by providing additional transmitters and monitors which are spaced different distances from the electrodes. These can be operated either sequentially or at different frequencies. The longer transmitter/electrode spacings will generate responses that are relatively deep, while the shorter transmitter/electrode spacings will provide relatively shallow responses.

Figure 26:
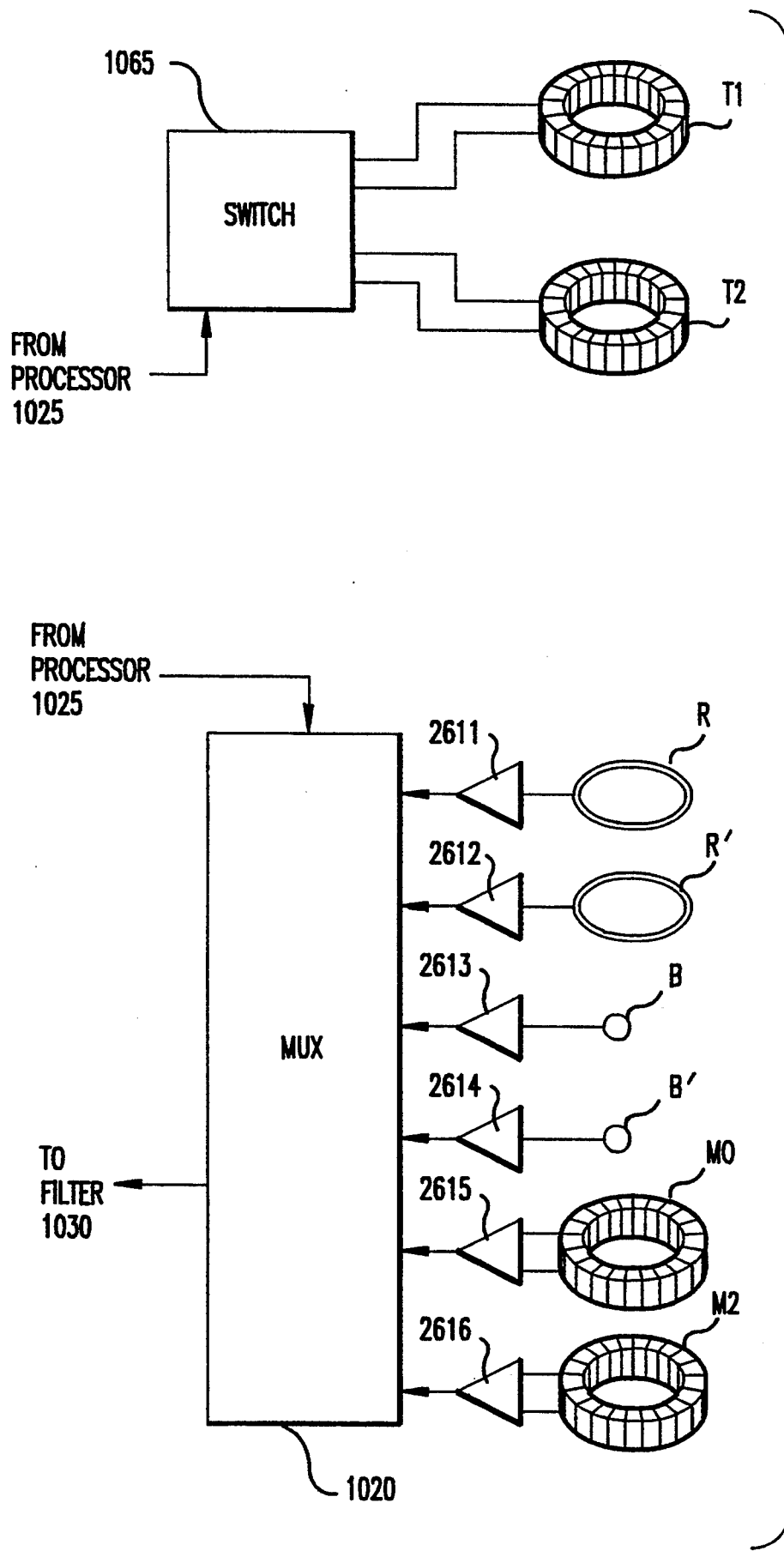
FIG. 26 is a block diagram of a portion of the electronics in accordance with an embodiment of the invention.

The electronics for the foregoing embodiments can be of the type set forth in the block diagram of FIG. 10 having the further features shown in the block diagram of FIG. 26. In particular, the switch 1065 (FIG. 10) is under control of the processor 1025 (FIG. 10) and couples an energizing signal to either transmitter T1 or T2. [If desired, these transmitters can be operated simultaneously out of phase, as previously described.] The multiplexer 1020 (FIG. 10), which is also under control of processor 1025, in this case receives inputs from the ring R via amplifier 2611, from one or more further rings represented at R' via amplifier 2612, from the button B via amplifier 2613, from one or more further buttons represented at B' via amplifier 2614, from receiver (monitor) toroid M0 via amplifier 2615, and from receiver (monitor) toroid M2 via amplifier 2616.

Figure 27:
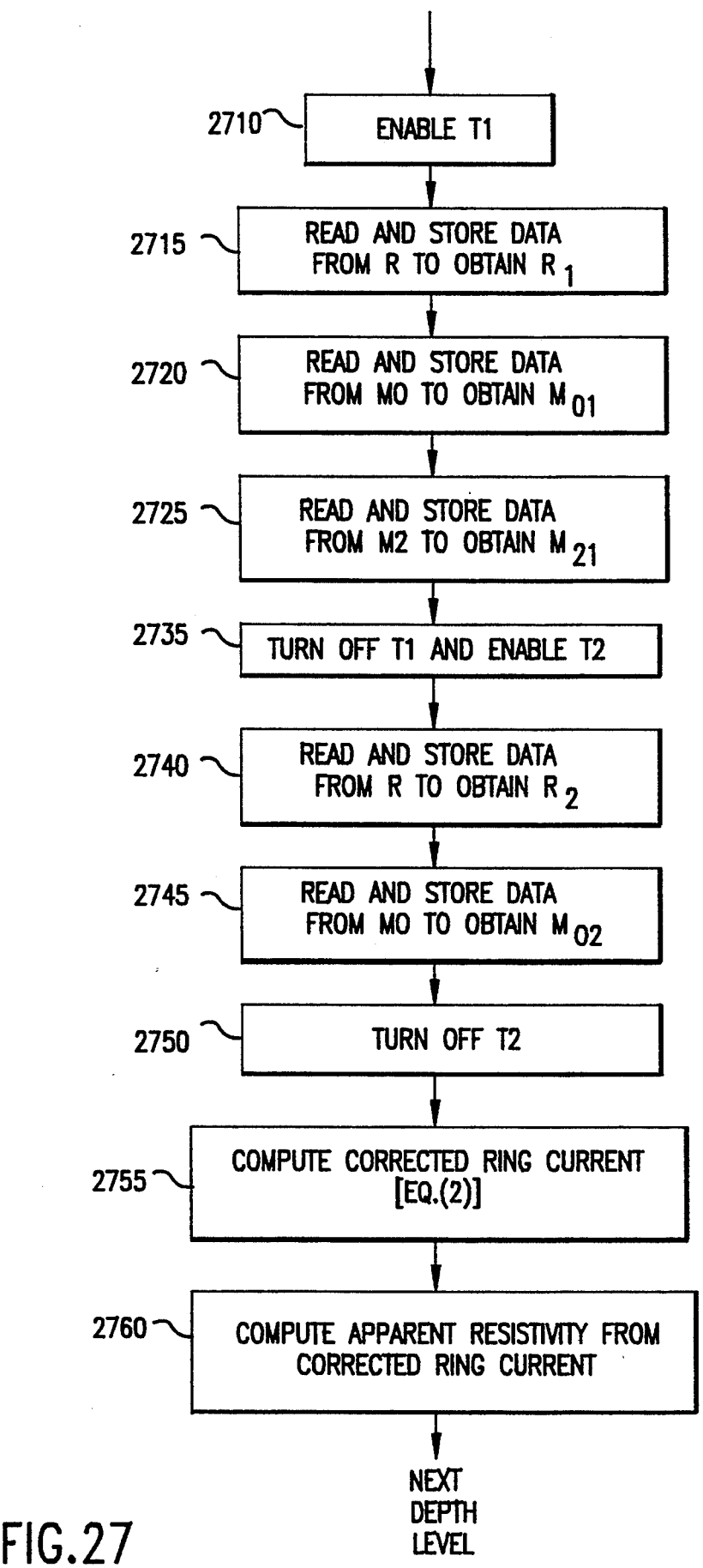
FIG. 27 is a flow diagram of a routine for controlling a processor in accordance with an embodiment of the invention.

FIG. 27 is a flow diagram of a routine for programming a processor, such as the processor 1025 of FIG. 10 (as modified by FIG. 26) to implement operation of the embodiment of FIG. 15 in accordance with a form of the invention. The block 2710 represents the enabling of transmission from transmitter T1, this being implemented by control of switch 1065. The blocks 2715, 2720 and 2725 respectively represent the measurement and storage of signal data received at receivers R, M0 and M2, the functions being initiated by controlling the multiplexer 1020 in sequence to obtain these measurements. In particular, the block 2715 represents the reading and storage of data from the ring electrode R to obtain $R_1$, the block 2720 represents the reading and storage of data from monitor toroid M0 to obtain $M_{01}$, and the block 2725 represents the reading and storage of data from monitor toroid M2 to obtain $M_{21}$. The transmitter T1 is then turned off and the transmitter T2 is enabled, as represented by the block 2735. The blocks 2740 and 2745 respectively represent the measurement and storage of signal data received at receivers R and M0, these functions again being initiated by controlling the multiplexer 1020. In particular, the block 2740 represents the reading and storage of data from ring electrode R to obtain $R_2$, and the block 2745 represents the reading and storage of data from monitor toroid M0 to obtain $M_{02}$. The transmitter T2 is then turned off (block 2750) and the corrected ring current is computed (block 2755) from equation (2). The apparent resistivity can then be obtained from the ring current as previously described, in accordance with $R_{app} = kV/I$.

In the flow diagram of FIG. 27, currents are generated and measured by operating transmitters T1 and T2 alternately. A similar result can be achieved utilizing frequency multiplexing, where both transmitters are operated simultaneously, but at different frequencies. This generates a current in the tool which has components at two frequencies. The current at any of the sensors (monitor, ring, or button) which comes from either transmitter can be determined by separating the received signal by frequency, such as with bandpass filters.

Figure 28:
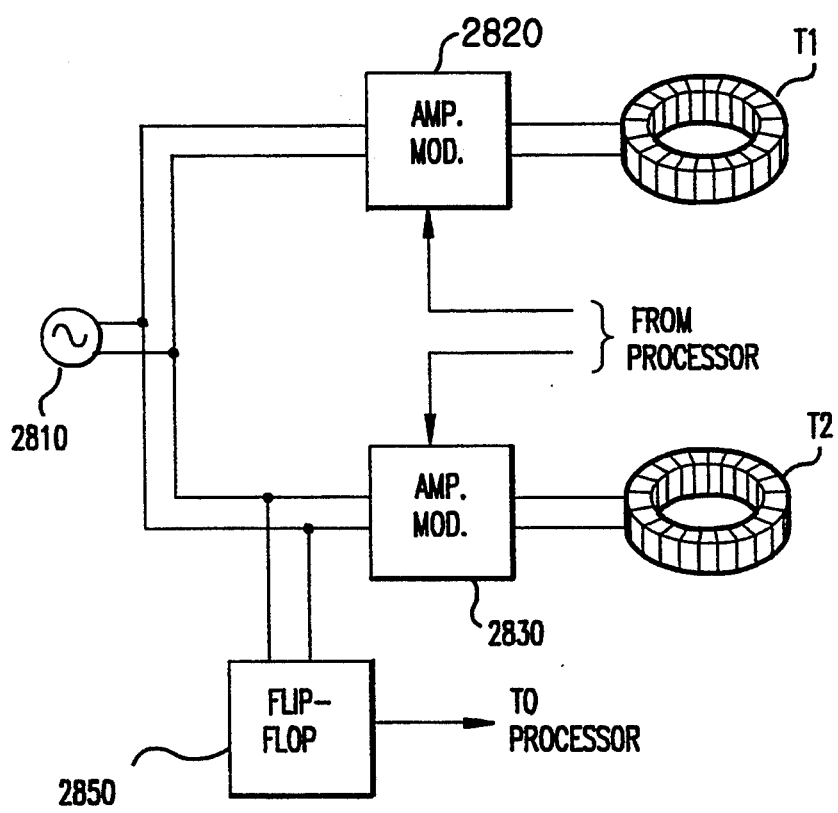
FIG. 28 is a block diagram of a portion of the electronics in accordance with another embodiment of the invention.
Figure 28:
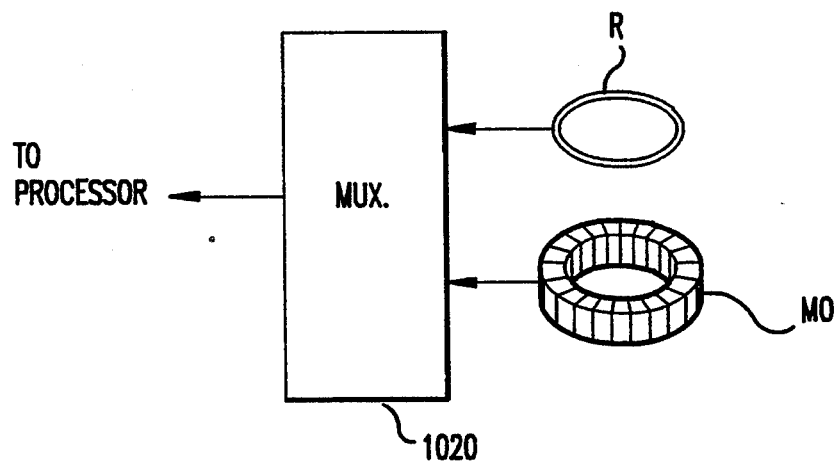

FIG. 28 illustrates a portion of the electronics that can be employed when the upper and lower transmitters are to be operated simultaneously and the monitor current is utilized to "balance" the resultant currents to contain a substantially zero axial current condition at the monitor toroid, such as the previously described monitor toroid M0. The AC source 2810 (which may, for example, be coupled to the transmitters through a switch, as in prior embodiments), is coupled to each of the transmitter toroidal antennas T1 and T2 via respective amplitude modulators 2820 and 2830. [Only one such amplitude modulator is strictly necessary, the general case being shown in this diagram.] The toroidal antennas are wired in phase opposition, so that they generate respective axial currents in the conductive body that travel in opposite directions. The amplitude modulators 2820 and 2830 are under control of processor 1025. The processor also receives a sample of the AC output via flip-flop 2850 which is switched to a different binary output state as the AC signal changes polarity, so that the processor knows the phase of the AC signal. In this case, the multiplexer 1020 is shown as receiving the output of the ring electrode R and the monitor toroidal antenna M0. In operation, when the current received at the monitor toroid M0 is above a predetermined threshold, amplitude control is sent to modulator 2820 and/or 2830 to reduce the current sensed by the monitor toroid in the manner of a conventional closed loop control. This embodiment is presently considered less preferred as it does not make use of the $M_{21}$ (or $M_{12}$) type of prefactor that is obtained by considering the effect of current from a transmitter independently.

Figure 29:
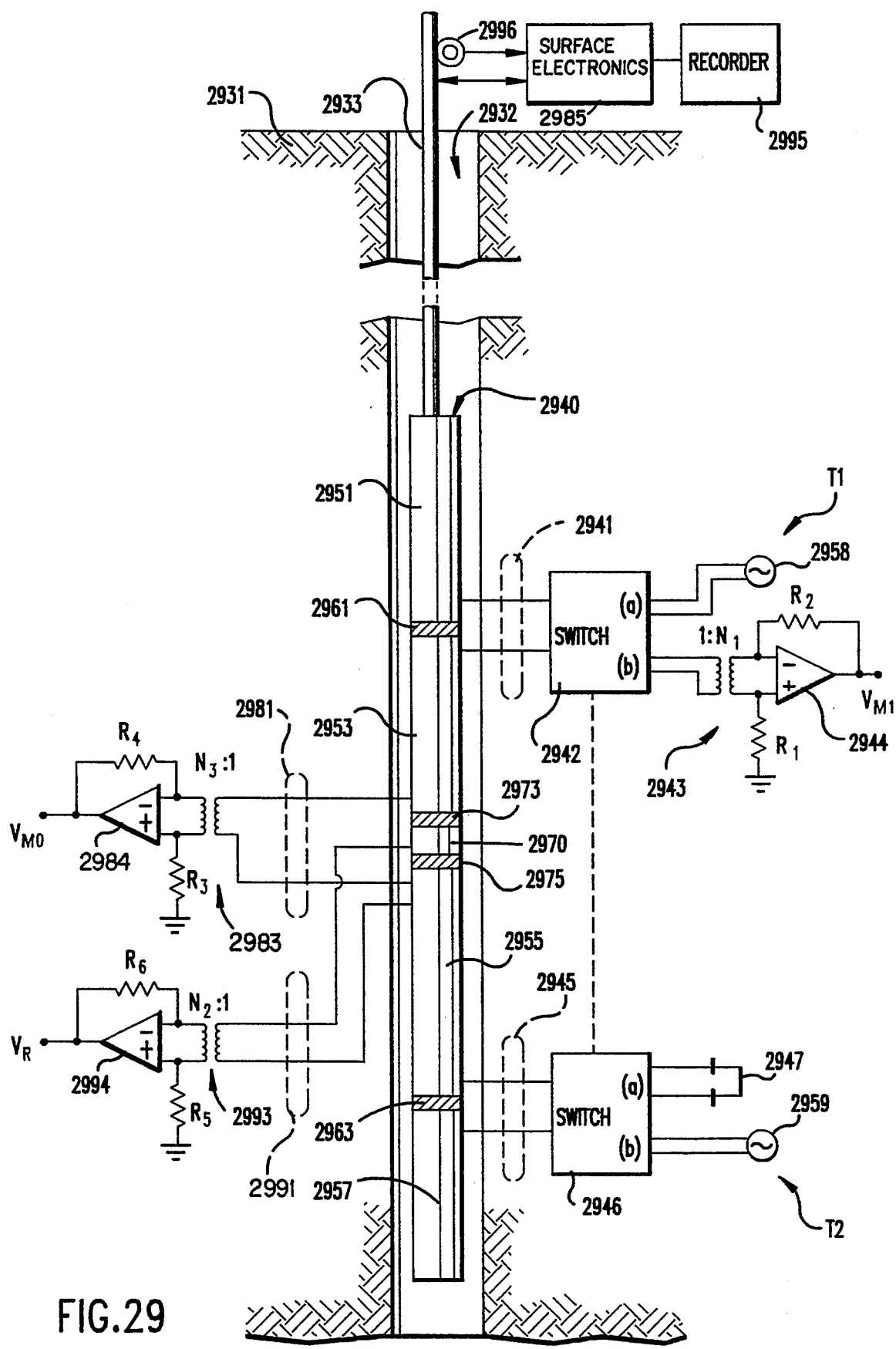
FIG. 29 is a schematic diagram, partially in block diagram form, of a further embodiment of the invention.

The principles of the invention are also applicable to logging in an earth borehole with the drill string removed. FIG. 29 illustrates a logging device 2940 for investigating subsurface formations 2931 traversed by a borehole 2932. The logging device is suspended in the borehole 2932 on an armored cable 2933, the length of which substantially determines the relative depth of the device 2940. The cable length is controlled by suitable means at the surface such as a drum and winch mechanism (not shown). Electronic signals indicative of the information obtained by the logging device can be conventionally transmitted through the cable 2933 to electronics 2985 and recorder 2995 located at the surface of the earth. Alternatively, some or all processing can be performed downhole. Depth information can be provided from a rotating wheel 2996 that is coupled to the cable 2933.

The logging device 2940 includes elongated generally cylindrical sections 2951, 2953, 2955 and 2957 which may be formed, for example, of conductive metal pipe. Electrically insulating isolators, 2961 and 2963 are located at the intersection of sections 2951 and 2953 and the intersection of sections 2955 and 2957, respectively. The isolators 2961 and 2963 may comprise, for example, threaded annular fiberglass pipe couplers. Located between the sections 2953 and 2955 is an electrode 2970, which is illustrated in the present embodiment as being a ring electrode, but could also be one or more button and/or ring electrodes. In the embodiment of FIG. 29, the ring 2970 is a conductive metal ring that is mounted between two more isolators 2973 and 2975.

In the present embodiment, the electronics, shown adjacent the logging device for ease of illustration, are located in the central hollow portion of one or more of the pipe sections of the device, although it will be understood that the electronics could alternatively be located in an adjacent module coupled above or below the device 2940, such as by a further coupler that may be conductive or non-conductive, with wiring that passes through the hollow sections and the annular couplers, as necessary. Power and computer processor control can be provided, for example, from the uphole electronics via cable 2933, it being understood that some of these functions, including communications capability, can be provided downhole, as is well known in the art. In the embodiment of FIG. 29, AC energizing sources for transmitters T1 and T2 are shown at 2958 and 2959, respectively. [Although separate energizing sources are illustrated, it will be understood that a common transmitter energizing source could alternatively be utilized.] The AC frequency may be, for example, in the range 100 Hz to 1 MHz. Conductor pair 2941 is coupled across pipe sections 2951 and 2953 and to one side of a switch 2942, the other side of which is coupled to either the transmitter T1 [switch position (a)] or to a low impedance winding of a current sense transformer 2943 [switch position (b)] which, in the illustrated embodiment, has a turns ratio $1:N_1$. The transformer secondary is coupled across the inverting and non-inverting inputs of an operational amplifier 2944, the non-inverting input of which is coupled to ground reference potential by resistor $R_1$. A feedback resistor $R_2$ is coupled between the output of operational amplifier 2944 and the inverting input thereof. The output of operational amplifier 2944 is designated $V_{M1}$.

A conductor pair 2945 is coupled across the pipe sections 2955 and 2957, and to one end of a switch 2946, the other end of which is coupled to either the transmitter T2 [switch position (b)] or to the short circuit 2947 [switch position (a)]. The switches 2942 and 2946 are under common control.

A further conductor pair 2981 couples pipe sections 2953 and 2955 via a low impedance winding of current sense transformer 2983 having an indicated turns ratio of $N_3:1$. The secondary winding of transformer 2983 is coupled across the inverting and non-inverting inputs of an operational amplifier 2984, the non-inverting input of which is coupled to ground reference potential by resistor $R_3$. A feedback resistor $R_4$ is coupled between the output of operational amplifier 2984 and the inverting input thereof. The output of operational amplifier 2984 is designated $V_{M0}$.

A further conductor pair 2991 couples the ring electrode 2970 to the pipe section 2955 (which is, in turn, effectively shorted to pipe section 2953 by the low impedance winding of transformer 2983) via a low impedance winding of current sense transformer 2993 having an indicated turns ratio of $N_2:1$. The secondary winding of transformer 2993 is coupled across the inverting and non-inverting inputs of an operational amplifier 2994, the non-inverting input of which is coupled to ground reference potential by resistor $R_5$. A feedback resistor $R_6$ is coupled between the output of operational amplifier 2994 and the inverting input thereof. The output of operational amplifier 2994 is designated $V_R$.

Operation is similar to the previously described case for sequential energizing of the transmitters T1 and T2, and the obtainment of measurement signals at the ring electrode and the monitor positions. [In this case, the second monitor is at the same position as the upper transmitter, as in the analogous arrangement of M1 in FIG. 24.] The electronics control can be similar to that described in conjunction with FIGS. 10, 11, 26 and 27. In particular, with the switches 2942 and 2946 at position "a", the transmitter T1 is operative and pipe sections 2955 and 2957 are shorted. Measurements are taken to obtain the voltages $V_{R1}$ and $V_{M01}$. The ring current $I_R$ is obtained from $$V_R = (R_5 + R_6) I_R / N_2, \quad (4)$$

that is:

$$I_R = V_R N_2 / (R_5 + R_6). \quad (5)$$

Similarly, the monitor current $M_0$ is obtained from $$V_{M0} = (R_3 + R_4) M_0 / N_3, \quad (6)$$

that is:

$$M_0 = V_{M0} N_3 / (R_3 + R_4). \quad (7)$$

Using the same convention as above, $V_{R1}$ and $V_{M01}$ are the voltages obtained with transmitter T1 enabled. Next, the switches 2942 and 2946 are put in position (b), the transmitter T2 is enabled, and the pipe sections 2951 and 2953 are effectively shorted. Measurements are taken to obtain the voltages $V_{M02}$ (from which the current $M_{02}$ is obtained in accordance with equation (7) above) and $V_{M12}$. The monitor current $M_1$ is obtained from $$V_{M1} = (R_1 + R_2) M_1 / N_1, \quad (8)$$

that is:
$$M_1 = V_{M1} N_1 / (R_1 + R_2). \quad (9)$$

Again, using the same convention ae above, $VM_{02}$ and $VM_{12}$ are the voltages obtained with transmitter T2 enabled. The compensated ring current, $I_{RC}$, is $$I_{RC} = (M_{02}/M_{12}) I_{R1} + (M_{01}/M_{12}) I_{R2}. \quad (10)$$

Apparent resistivity in the region surrounding the ring electrode is inversely proportional to the corrected ring current.

The embodiment illustrated in FIG. 29 uses isolators in establishing electrical potential differences between conductive sections of the body of the logging device, and to electrically isolate the electrode 2970. Also, currents are measured with direct current flow occurring through a low impedance winding of a current sense transformer. It will be understood that, for example, the voltage gaps at isolators 2961 and/or 2963, and their associated sources could alternatively be toroidal transmitters and their associated sources as in previous embodiments, and that currents can be measured using toroidal receivers. Also, the electrode may be, for example, a button or ring electrode of the type previously described. Similarly, it will be understood that the techniques illustrated in FIG. 29 could be employed, in whole or in part, in a measurement-while-drilling embodiment, but are presently considered less preferred for such application from at least the standpoint of construction ruggedness.

The invention has been described with reference to particular preferred embodiments, but variations within the spirit and scope of the invention will occur to those skilled in the art. For example, it will be understood that while separate toroidal antennas are shown for transmitting and receiving from substantially the same position (there being certain practical advantages to having different antennas for use as transmitter and receiver), a single toroidal antenna can be shared for this purpose using suitable switching. Also, it will be understood that functions which are illustrated as being implemented using a processor control can alternatively be implemented using hard-wired analog and/or digital processing.

We claim:

1. Apparatus for determining the resistivity of formations surrounding an earth borehole, comprising:
    an elongated electrically conductive body that is moveable through the borehole;
    first transmitter means for establishing a first current in the body from a first transmitter position on the body, said first current traveling in a path that includes the body and the formations;
    an electrode on said body having a surface that is electrically isolated from the surface of the body;
    means for measuring at said electrode a first electrical signal resulting from said first current;
    second transmitter means for establishing a second current in the body from a second transmitter position on the body that is spaced from the first transmitter position, said second current traveling in a path that includes the body and the formations;
    means for measuring at said electrode a second electrical signal resulting from said second current;
    current monitor means for measuring the axial current passing a monitor position on the body to obtain a monitor current value; and
    means for deriving an indication of formation resistivity as a function of said first electrical signal, said second electrical signal, and said monitor current value.

2. Apparatus as defined by claim 1, wherein said current monitor means comprises means for obtaining a first monitor current value when said first transmitter means is operative, and means for obtaining a second monitor current value when said second transmitter means is operative, said deriving means being operative to derive said indication of formation resistivity as a function of said first electrical signal, said second electrical signal, said first monitor current value, and said second monitor current value.

3. Apparatus as defined by claim 1, further comprising further current monitor means at a further monitor position for measuring the axial current passing a further monitor position on said body to obtain a further monitor current value, said deriving means being operative to derive said indication of formation resistivity as a function of said further monitor current value.

4. Apparatus as defined by claim 2, further comprising further current monitor means at a further monitor position for measuring the axial current passing a further monitor position on said body to obtain a further monitor current value, said deriving means being operative to derive said indication of formation resistivity as a function of said further monitor current value.

5. Apparatus as defined by claim 1, wherein said first and second transmitter positions are spaced apart on said body, said electrode is located between said first and second transmitter positions, and said monitor position is located between said first and second transmitter positions.

6. Apparatus as defined by claim 4, wherein said first and second transmitter positions are spaced apart on said body, said electrode is located between said first and second transmitter positions, and said monitor position is located between said first and second transmitter positions.

7. Apparatus as defined by claim 5, wherein said monitor position is adjacent said electrode.

8. Apparatus as defined by claim 6, wherein said monitor position is adjacent said electrode.

9. Apparatus as defined by claim 6, wherein said further monitor position is adjacent one of said transmitter positions, and said further monitor obtains said further monitor current value when the transmitter means at the other of said transmitter positions is operative.

10. Apparatus as defined by claim 8, wherein said further monitor position is adjacent one of said transmitter positions, and said further monitor obtains said further monitor current value when the transmitter means at the other of said transmitter positions is operative.

11. Apparatus as defined by claim 6, wherein said first electrical signal is designated $R_1$, said second electrical signal is designated $R_2$, said first monitor current value is designated $M_{01}$, said second monitor current value is designated $M_{02}$, and said further monitor current value is designated $M_{12}$, and wherein said deriving means derives said formation resistivity as being inversely proportional to $$\frac{1}{M_{12}} (M_{02}R_1 + M_{01}R_2).$$

12. Apparatus as defined by claim 9, wherein said first electrical signal is designated $R_1$, said second electrical signal is designated $R_2$, said first monitor current value is designated $M_{01}$, said second monitor current value is designated $M_{02}$, and said further monitor current value is designated $M_{12}$, and wherein said deriving means derives said formation resistivity as being inversely proportional to $$\frac{1}{M_{12}} (M_{02}R_1 + M_{01}R_2).$$

13. Apparatus as defined by claim 10, wherein said first electrical signal is designated $R_1$, said second electrical signal is designated $R_2$, said first monitor current value is designated $M_{01}$, said second monitor current value is designated $M_{02}$, and said further monitor current value is designated $M_{12}$, and wherein said deriving means derives said formation resistivity as being inversely proportional to $$\frac{1}{M_{12}} (M_{02}R_1 + M_{01}R_2).$$

14. Apparatus as defined by claim 1, wherein said first and second transmitter means and said current monitor means each comprise a toroidal antenna.

15. Apparatus as defined by claim 4, wherein said first and second transmitter means, said current monitor means and said further current monitor means each comprise a toroidal antenna.

16. Apparatus as defined by claim 1, wherein said electrode comprises a ring electrode.

17. Apparatus as defined by claim 14, wherein said electrode comprises a ring electrode.

18. Apparatus as defined by claim 1, wherein said electrode comprises a button electrode.

19. Apparatus as defined by claim 14, wherein said electrode comprises a button electrode.

20. Apparatus as defined by claim 1, wherein said conductive body is a metal drill collar on a drill string.

21. Apparatus as defined by claim 4, wherein said conductive body is a metal drill collar on a drill string.

22. Apparatus as defined by claim 1, wherein said conductive body comprises electrically coupled pipe sections.

23. Apparatus as defined by claim 4, wherein said conductive body comprises electrically coupled pipe sections.

24. Apparatus as defined by claim 23, wherein said body is suspended in said borehole on a wireline.

25. A method for determining the resistivity of formations surrounding an earth borehole, comprising the steps of:
providing an elongated electrically conductive body that is moveable through the borehole;
establishing a first current in the body from a first transmitter position on the body, said first current traveling in a path that includes the body and the formations;
providing an electrode on the body having a surface that is electrically isolated from the surface of the body;
measuring at said electrode a first electrical signal resulting from said first current;
establishing a second current in the body from a second transmitter position on the body that is spaced from the first transmitter position, said second current traveling in a path that includes the body and the formations;
measuring at said electrode, a second electrical signal resulting from said second current;
measuring the axial current passing a monitor position on the body to obtain a monitor current value; and
deriving an indication of formation resistivity as a function of said first electrical signal, said second electrical signal, and said monitor current value.

26. A method for determining the resistivity of formations surrounding a borehole, comprising the steps of:
providing an elongated electrically conductive body that is moveable through the borehole;
establishing a current in said body that travels in a path that includes the body and the formations;
measuring an electrical signal resulting from said current at an electrode on the body that has a surface which is electrically isolated from the surface of the body, to obtain a measured electrode signal;
deriving a compensation signal from a measurement of axial current in the body; and
producing a compensated electrode signal as a function of said measured electrode signal and said compensation signal, the compensated electrode signal being indicative of formation resistivity.

27. The method as defined by claim 26, further comprising the step of deriving formation resistivity from said compensated electrode signal.

28. The method as defined by claim 26, wherein said step of establishing a current comprises establishing first and second currents from spaced-apart transmitter positions on said body.

29. A method for determining the resistivity of formations surrounding a borehole, comprising the steps of:
providing an elongated electrically conductive body that is moveable through the borehole;
providing a first source to establish a first current in the body that travels in a path that includes the body and the formations;
providing a second source to establish a second current in the body that travels in a path that includes the body and the formations such that said second and first currents travel in opposite directions in the body;
measuring axial current in the body, and controlling at least one of said sources as a function of the measured axial current; and
measuring an electrical signal at an electrode on the body that has a surface which is electrically isolated from the surface of the body, said signal being indicative of formation resistivity.

30. The method as defined by claim 29, further comprising the step of deriving formation resistivity from said signal.

31. The method as defined by claim 29, wherein said axial current is measured at a position on said body that is adjacent said electrode.

32. Apparatus for determining the resistivity of formations surrounding a borehole, comprising:
an elongated electrically conductive body that is moveable through the borehole;
first means for establishing a first current in the body that travels in a path that includes the body and the formations;
second means for establishing a second current in the body that travels in a path that includes the body and the formations such that said second and first currents travel in opposite directions in the body;
means for measuring axial current in the body, and for controlling at least one of said first and second means as a function of the measured axial current; and
means for measuring an electrical signal at an electrode on the body that has a surface which is electrically isolated from the surface of the body, said signal being indicative of formation resistivity.

33. Apparatus as defined by claim 32, further comprising means for deriving formation resistivity from said signal.

34. Apparatus as defined by claim 32, wherein said axial current is measured at a position on said body that is adjacent said electrode.

35. A measurement-while-drilling system for determining the resistivity of formations surrounding a borehole being drilled in the earth by a drill bit at the end of a drill string, comprising:

a drill collar in said drill string, said drill collar comprising an elongated tubular body formed of an electrically conductive material;

first toroidal transmitter means for establishing a first current in the body from a first transmitter position on the body, said first current traveling in a path that includes the body and the formations;

an electrode on the body having a surface that is electrically isolated from the surface of the body;

means for measuring at said electrode a first electrical signal resulting from said first current;

second toroidal transmitter means for establishing a second current in the body from a second transmitter position on the body that is spaced from the first transmitter position, said second current traveling in a path that includes the body and the formations;

means for measuring at said electrode, a second electrical signal resulting from said second current;

current monitor toroidal antenna means adjacent said electrode for measuring the axial current passing a monitor position on the body to obtain a monitor current value; and means for deriving an indication of formation resistivity as a function of said first electrical signal, said second electrical signal, and said monitor current value.

36. The system as defined by claim 35, wherein said current monitor means comprises means for obtaining a first monitor current value when said first transmitter means is operative, and means for obtaining a second monitor current value when said second transmitter means is operative, said deriving means being operative to derive said indication of formation resistivity as a function of said first electrical signal, said second electrical signal, said first monitor current value, and said second monitor current value.

37. The system as defined by claim 36, further comprising further current monitor toroidal antenna means at a further monitor position for measuring the axial current passing a further monitor position on said body to obtain a further monitor current value, said deriving means being operative to derive said indication of formation resistivity as a function of said further monitor current value.

38. The system as defined by claim 37, wherein said first and second transmitter positions are spaced apart on said body, said electrode is located between said first and second transmitter positions, and said monitor position is located between said first and second transmitter positions.

39. The system as defined by claim 38, wherein said further monitor position is adjacent one of said transmitter positions, and said further monitor obtains said further monitor current value when the transmitter means at the other of said transmitter positions is operative.

40. The system as defined by claim 39, wherein said first electrical signal is designated $R_1$, said second electrical signal is designated $R_2$, said first monitor current value is designated $M_{01}$, said second monitor current value is designated $M_{02}$, and said further monitor current value is designated $M_{12}$, and wherein said deriving means derives said formation resistivity as being inversely proportional to $$\frac{1}{M_{12}} (M_{02}R_1 + M_{01}R_2).$$

41. The system as defined by claim 35, wherein said electrode comprises a ring electrode.

42. The system as defined by claim 35, wherein said electrode comprises a button electrode.

* * * * *